(12) United States Patent
Fung

(10) Patent No.: US 9,275,178 B1
(45) Date of Patent: Mar. 1, 2016

(54) METHOD AND APPARATUS FOR CONSIDERING PATHS INFLUENCED BY DIFFERENT POWER SUPPLY DOMAINS IN TIMING ANALYSIS

(71) Applicant: Altera Corporation, San Jose, CA (US)

(72) Inventor: Ryan Fung, Mississauga (CA)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/715,259

(22) Filed: Dec. 14, 2012

Related U.S. Application Data

(63) Continuation-in-part of application No. 13/537,115, filed on Jun. 29, 2012, now Pat. No. 8,904,331.

(51) Int. Cl.
*G06F 9/455* (2006.01)
*G06F 17/50* (2006.01)

(52) U.S. Cl.
CPC .................. *G06F 17/5045* (2013.01)

(58) Field of Classification Search
USPC .......................................................... 716/113
See application file for complete search history.

(56) References Cited

U.S. PATENT DOCUMENTS

| | | | |
|---|---|---|---|
| 7,428,716 B2 * | 9/2008 | Visweswariah | 716/113 |
| 7,784,003 B2 | 8/2010 | Buck et al. | |
| 8,239,798 B1 * | 8/2012 | Goyal et al. | 716/113 |

* cited by examiner

*Primary Examiner* — Eric Lee
(74) *Attorney, Agent, or Firm* — L. Cho

(57) ABSTRACT

A method for modeling variation includes identifying delay-impacting parameters associated with path elements in arrival paths and required paths. Arrival time traversal and required time traversal are performed for the arrival paths and required paths based on assumptions made for the delay-impacting parameters associated with the path elements.

26 Claims, 29 Drawing Sheets

Typical Analysis Performed at Worst Corner (Setup – Slow)
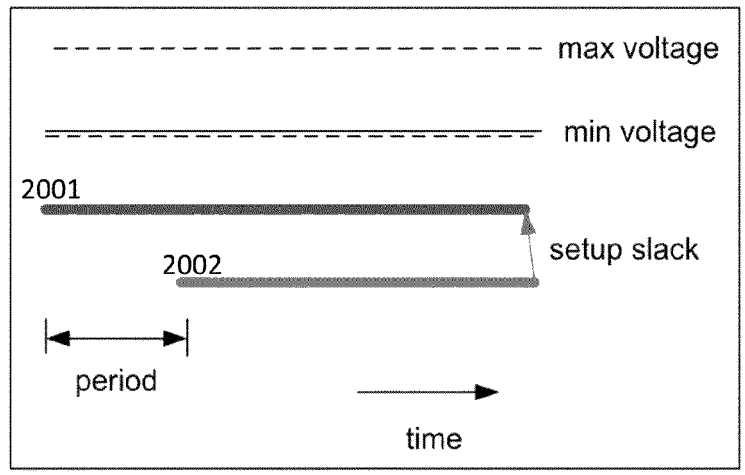
Typical Analysis Performed at Worst Corner (Setup – Fast)
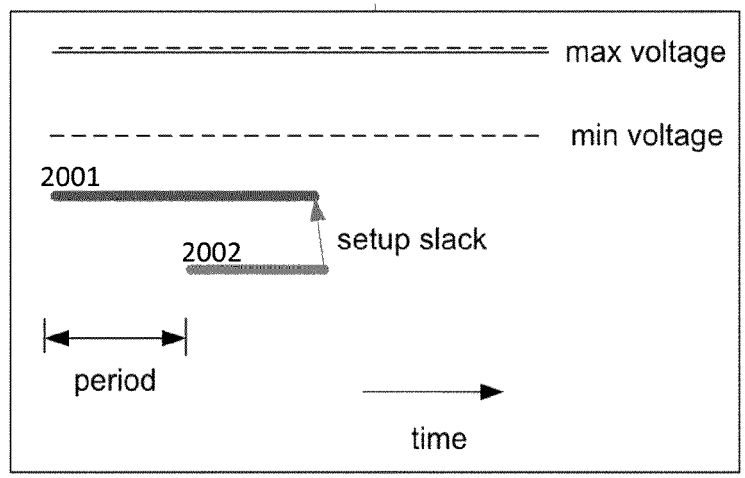
Analysis Assuming Voltage Transients at Worst Corner (Setup – Slow)
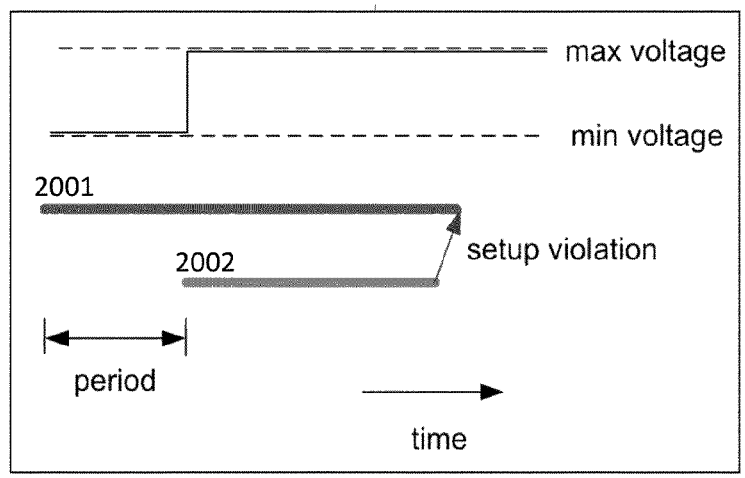
FIG. 20

| Phase Relationship | Slow Corner | | Fast Corner | |
| --- | --- | --- | --- | --- |
| | Setup | Hold | Setup | Hold |
| > 0 | Decrease Required Path Delay if Required Path is More Sensitive | Unlikely Critical – Less Important to Add Conservatism to Analysis | Unlikely Critical – Less Important to Add Conservatism to Analysis | Increase Required Path Delay if Required Path is More Sensitive |
| 0 | Impact of Sensitivity Differences Should Be a Maximum at Corners – Less Important to Add Conservatism to Analysis | | | |
| < 0 | Unlikely Critical – Less Important to Add Conservatism to Analysis | Decrease Arrival Path Delay if Arrival Path is More Sensitive | Increase Arrival Path Delay if Arrival Path is More Sensitive | Unlikely Critical – Less Important to Add Conservatism to Analysis |

METHOD AND APPARATUS FOR CONSIDERING PATHS INFLUENCED BY DIFFERENT POWER SUPPLY DOMAINS IN TIMING ANALYSIS

RELATED APPLICATIONS

This application is a continuation-in-part of, and claims the benefit under Title 35, U.S.C. Section 120 of co-pending U.S. application Ser. No. 13/537,115 filed on Jun. 29, 2012 and entitled "METHOD AND APPARATUS FOR PERFORMING TIME DOMAIN JITTER MODELING".

FIELD

Embodiments of the present invention relate to tools for designing systems on target devices. More specifically, embodiments of the present invention relate to a method and apparatus for considering paths influenced by different power supply domains in timing analysis of systems.

BACKGROUND

Target devices such as field programmable gate arrays (FPGAs), structured application specific integrated circuits (ASICs), and ASICs are used to implement large systems that may include million of gates and megabits of embedded memory. The complexity of a large system often requires the use of electronic design automation (EDA) tools to create and optimize a design for the system in physical target devices. Among the procedures performed by EDA tools in a computer aided design (CAD) compilation flow are synthesis, placement, routing, and timing analysis of the system on the target device.

Silicon devices used for target devices have seen the trends of more aggressive performance targets and dropping supply voltages from generation to generation. Transistor threshold voltages have not been keeping up with the dropping supply voltages. As a result, transistors are not turned on as well as they have been in the past, which in turn means that the delays of gates and buffers are growing more sensitive to supply voltage changes. Increased path delay variation manifests as increased cycle-to-cycle delay variation, otherwise known as jitter. Jitter is a form of timing uncertainty that acts to reduce timing margins which are continually shrinking as performance targets are increased.

It is important to model the impact of jitter on timing margins. In particular, what is needed is a model flexible enough to cover two usage scenarios. The first scenario involves designers working with characterized field programmable gate array (FPGA) silicon. These designers expect timing analysis to report accurate and conservative timing margins that allow them to evaluate design options such as performance targets, input output placement, clocking strategies, and registering and placement of intellectual property (IP) blocks. Part of this analysis will include estimates of jitter accumulation along clock and data paths that are customized to the FPGA configurations being studied. The second scenario involves FPGA architects evaluating sets of features to offer in future generations of FPGA. These architects require reasonable predictions of timing margins to evaluate alternative structures and to assess whether features justify their area, power, and design effort costs.

SUMMARY

According to embodiments of the present invention, methods and apparatus for modeling jitter effects are disclosed. The embodiments account for jitter accumulated by signals broadcast off-chip or received from off-chip which apply to IO interfaces such as external memory interfaces. The embodiments also account for the impact of supply noise on data transfers inside a core of a device.

According to other embodiments of the present invention, methods and apparatus for modeling variation in a system are disclosed. Delay-impacting parameters associated with path elements in arrival paths and required paths are identified. Arrival time traversals and required time traversals are performed based on enumerating assumptions made for a subset of the delay-impacting parameters associated with the path elements.

BRIEF DESCRIPTION OF THE DRAWINGS

The features and advantages of embodiments of the present invention are illustrated by way of example and are not intended to limit the scope of the embodiments of the present invention to the particular embodiments shown.

FIG. 20 illustrates a typical setup analysis performed at a worst slow corner, a typical setup analysis at a worst fast corner, and a setup analysis assuming voltage transients occur, according to an embodiment of the present invention.

FIG. 21 is a chart illustrating a summary of how adjustments may be made to path delays as a function of phase relationship, timing corner, and analysis type according to an embodiment of the present invention.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, procedures, and programs are shown in block diagram form to avoid obscuring embodiments of the present invention unnecessarily.

Figure 1:
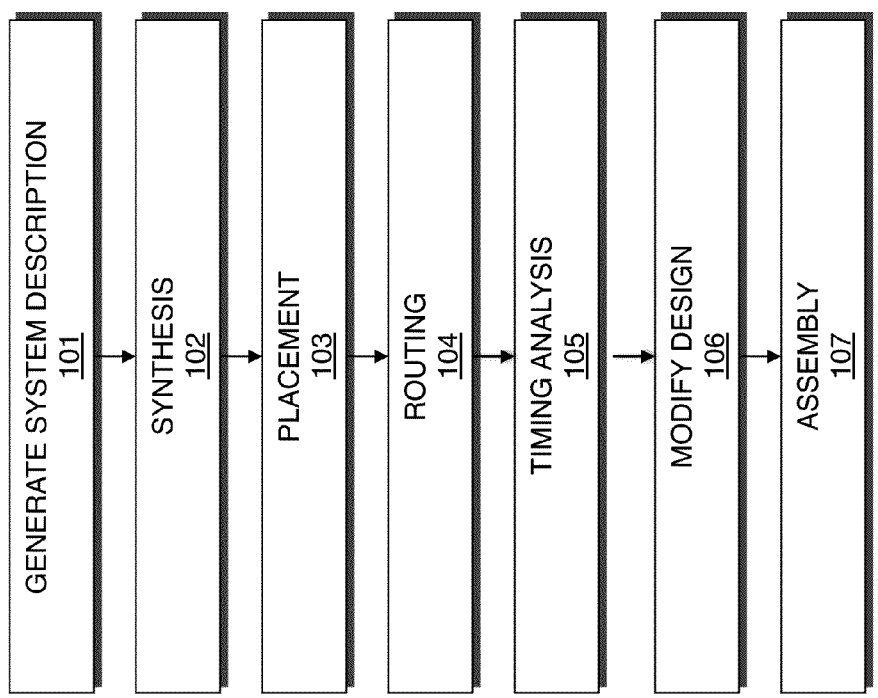
FIG. 1 is a flow chart illustrating a method for designing a system on a target device according to an exemplary embodiment of the present invention.

FIG. 1 is a flow chart illustrating a method for designing a system on a target device according to an exemplary embodiment of the present invention. The target device may be a field programmable gate array (FPGA), application specific integrated circuit (ASIC), a structured ASIC, or other programmable device. According to one embodiment, the procedure illustrated in FIG. 1 may be performed by a computer aided design (CAD)/electronic design automation (EDA) tool implemented on a computer system. At 101, a description of a system is generated. According to an embodiment of the present invention, a hardware description language (HDL) design definition is generated to describe the system. The HDL is generated in response to specifications of the system provided by a designer. The specifications may be provided through a design entry tool. The specifications may describe components and interconnections in the system.

At 102, the system is synthesized. Synthesis includes generating a logic design of the system to be implemented by the target device. According to an embodiment of the present invention, synthesis generates an optimized logical representation of the system from the HDL design definition. Synthesis also includes mapping the optimized logic design. Mapping includes determining how to implement logic gates and logic elements in the optimized logic representation with specific resources on the target device. According to an embodiment of the present invention, a netlist is generated from mapping. This netlist may be an optimized technology-mapped netlist generated from the HDL.

At 103, the system is placed. According to an embodiment of the present invention, placement involves placing the mapped logical system design on the target device. Placement works on the technology-mapped netlist to produce a placement for each of the functional blocks. According to an embodiment of the present invention, placement includes fitting the system on the target device by determining which resources on the logic device are to be used for specific logic elements, and other function blocks, determined to implement the system during synthesis. Placement may include clustering which involves grouping logic elements together to form the logic clusters present on the target device. According to an embodiment of the present invention, clustering is performed at an early stage of placement and occurs directly after synthesis during the placement preparation stage.

At 104, the placed design is routed. During routing, routing resources on the target device are allocated to provide interconnections between logic gates, logic elements, and other components on the target device. Routability optimization may also be performed on the placed logic design. According to an embodiment of the present invention, the goal of routability optimization is to reduce the amount of wiring used to connect components in the placed logic design. Routability optimization may include performing fanout splitting, logic duplication, logical rewiring, or other procedures. It should be appreciated that one or more of the procedures may be performed on the placed logic design.

At 105, timing analysis is performed on the system designed by procedures 101-104. According to an embodiment of the present invention, the timing analysis determines whether timing constraints of the system are satisfied. As a part of timing analysis, jitter analysis may be conducted utilizing time-domain jitter modeling. Jitter may be defined as a variation in time offset of two events.

At 106, the design for the system is modified in response to the timing analysis. According to an embodiment of the present invention, the design for the system may be modified in response to determining that timing constraints have not been satisfied. The design for the system may be modified by a designer manually or alternatively the design may be modified automatically by the EDA tool by re-executing one or more of procedures 102-104. It should also be appreciated that each procedure may perform this optimization in its first invocation by performing the analysis during its execution.

At 107, an assembly procedure is performed. The assembly procedure involves creating a data file that includes information determined by the procedures described at 101-106. The data file may be a bit stream that may be used to program a target device. According to an embodiment of the present invention, the procedures illustrated in FIG. 1 may be performed by an EDA tool executed on a first computer system. The data file generated may be transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium. The target device may be programmed with the data file. By programming the target with the data file, components on the target device are physically transformed to implement the system.

According to an embodiment of the present invention, techniques for estimating jitter and its impact on timing margin may be tailored based on knowledge of voltage transients and how path delays change with voltage and other operating condition changes. Jitter may be defined as a variation in the time offset of two events. These two events may be, for example, consecutive clock rising edges. In the case of consecutive clock rising edges, period jitter is what is of interest. An ideal clock waveform at a phase locked loop source has a period-long time interval between consecutive rising edges. After traveling through a clock distribution network, jitter will accumulate such that at an output node the time interval between consecutive rising edges would be the clock period plus or minus (+/−) a tolerance.

Figure 2:
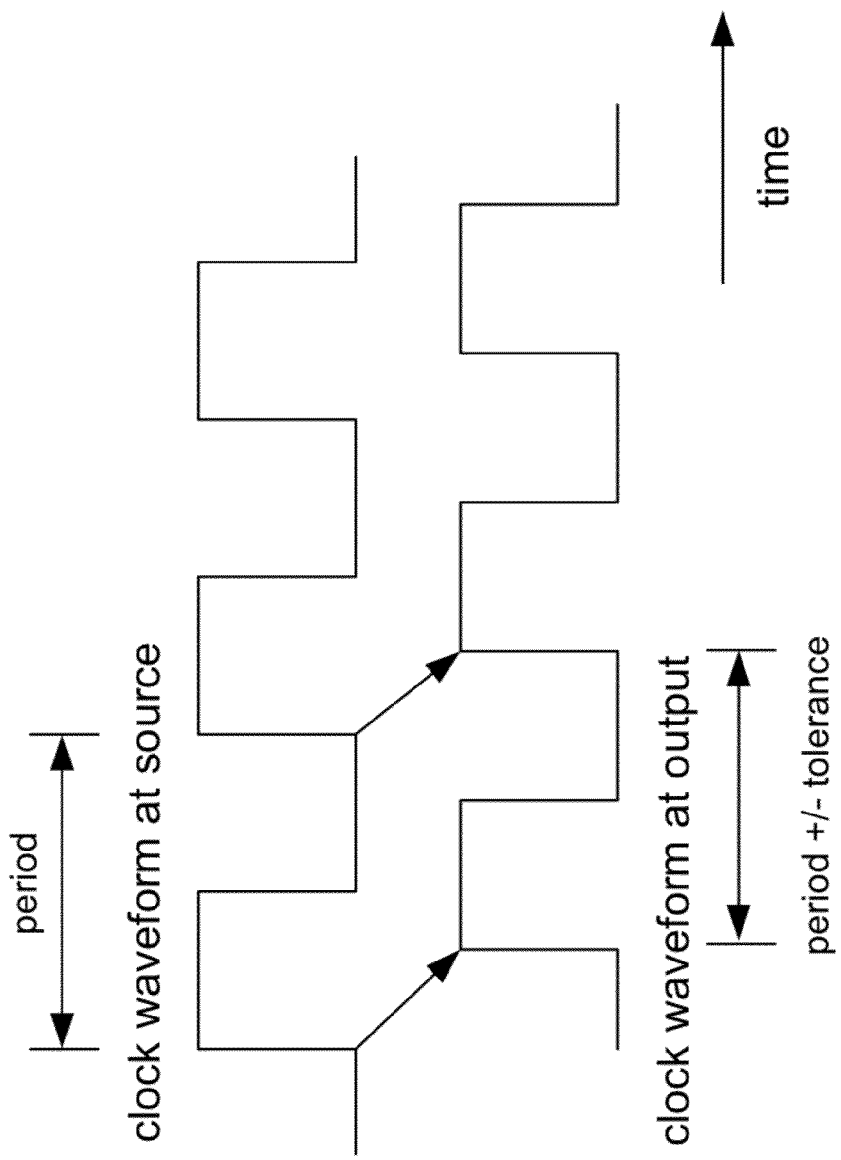
FIG. 2 illustrates an example of jitter represented as +/− tolerance according to an embodiment of the present invention.

FIG. 2 illustrates an example of jitter represented as +/− tolerance. A first clock waveform at a source is illustrated. The time from a beginning of a rising edge to a beginning of a next rising edge of the first clock waveform is defined as a period. A second waveform at an output or destination is also illustrated. The time from a beginning of a rising edge to a beginning of a next rising edge of the second clock waveform is defined as the period +/− tolerance. The tolerance is a function of the possibilities for jitter accumulation on a relevant clock path due to voltage changes over time and may add to or subtract from the period.

Figure 3:
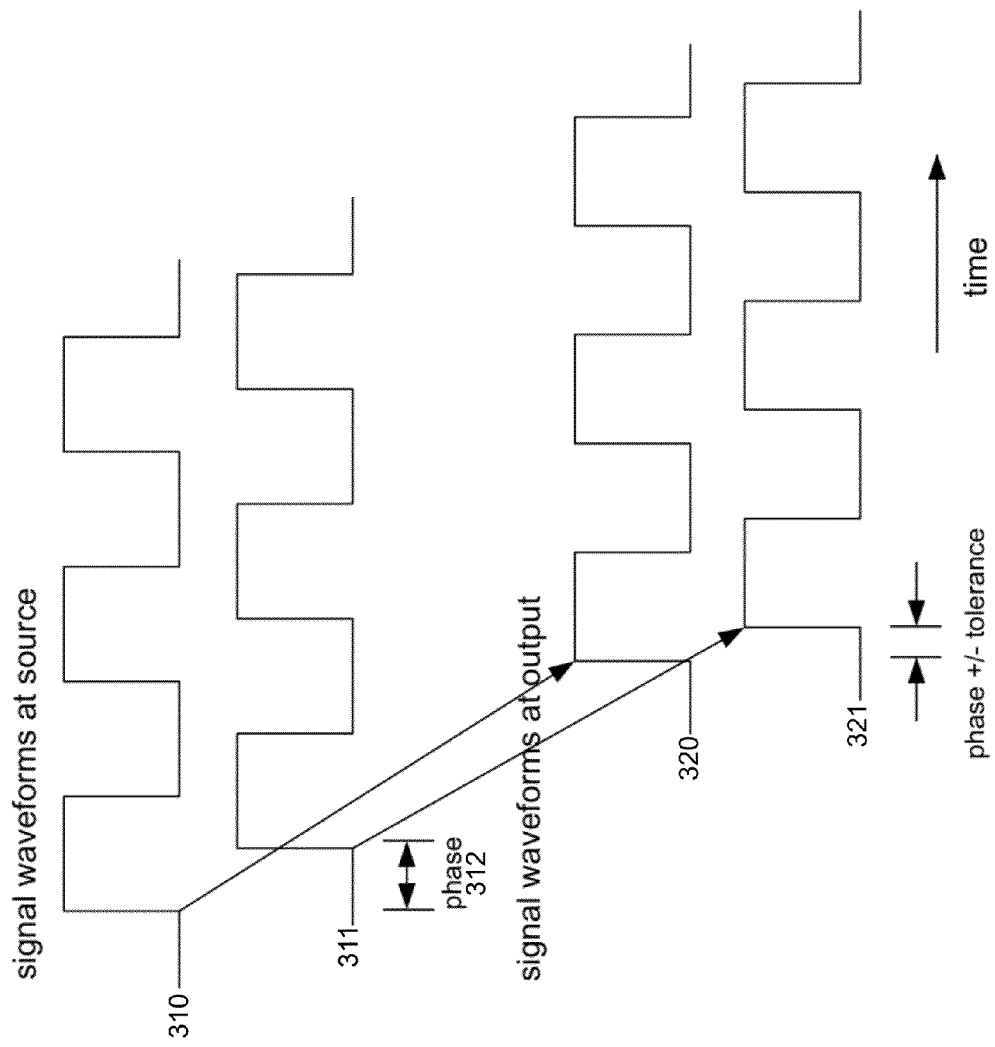
FIG. 3 illustrates an example where jitter is measured with respect to two different signals according to an embodiment of the present invention.

FIG. 3 illustrates an example where jitter is measured with respect to two different signals. A first signal illustrated is a DQ signal 310 at a source. A second signal is a DQ strobe signal 311 at the source. A phase 312 is the time measured between a rising edge of the DQ signal 310 and a rising edge of the DQ strobe signal 311. A third signal illustrated is a DQ signal 320 at an output or destination. A fourth signal illustrated is a DQ strobe signal 321 at the output or destination. In this example, the time measured between a rising edge of the DQ signal 320 and a rising edge of the strobe signal 321 is the phase +/− tolerance. The tolerance is a function of the jitter accumulation may manifest due to relative path delay changes that occur as a consequence of both voltage and temperature changes. As the first and second signals are transmitted through routing in a target device, the initial phase offset may be affected by the +/− tolerance as illustrated by the relationship between the third and fourth signals.

In this description, the term 'signal' is generally used to refer both to events and signals. So two signals may refer to two events along a single signal's waveform or two electrically different signals (the relative time between which is of interest). When characterizing jitter between two signals (two events or two signals), an assumption is generally made that the signals are traversing the same path, if there is a single path, or paths that are manufactured to be of similar delay. This is typically the case when preserving the timing relationship between the signals is important. If this were not the case, the delay variation of the "unmatched" portion of the two paths may be characterized by examining the delay variation over process, voltage, and/or temperature extremes, whichever are applicable to the conditions under study. This delay variation may be significant, but may be characterized. The characterization of "matched" paths may be more challenging because of the correlations between the paths which act to significantly reduce the impact of variation on relative delays.

Voltage noise may be characterized in the time domain. If hardware measurements of voltage noise are being taken, time-domain samples are typically available. If frequency-domain representations of voltage noise are available, time-domain transformations can be done as pre-cursor to characterization. Voltage changes can be characterized as either slowly varying or quick varying.

Figure 4:
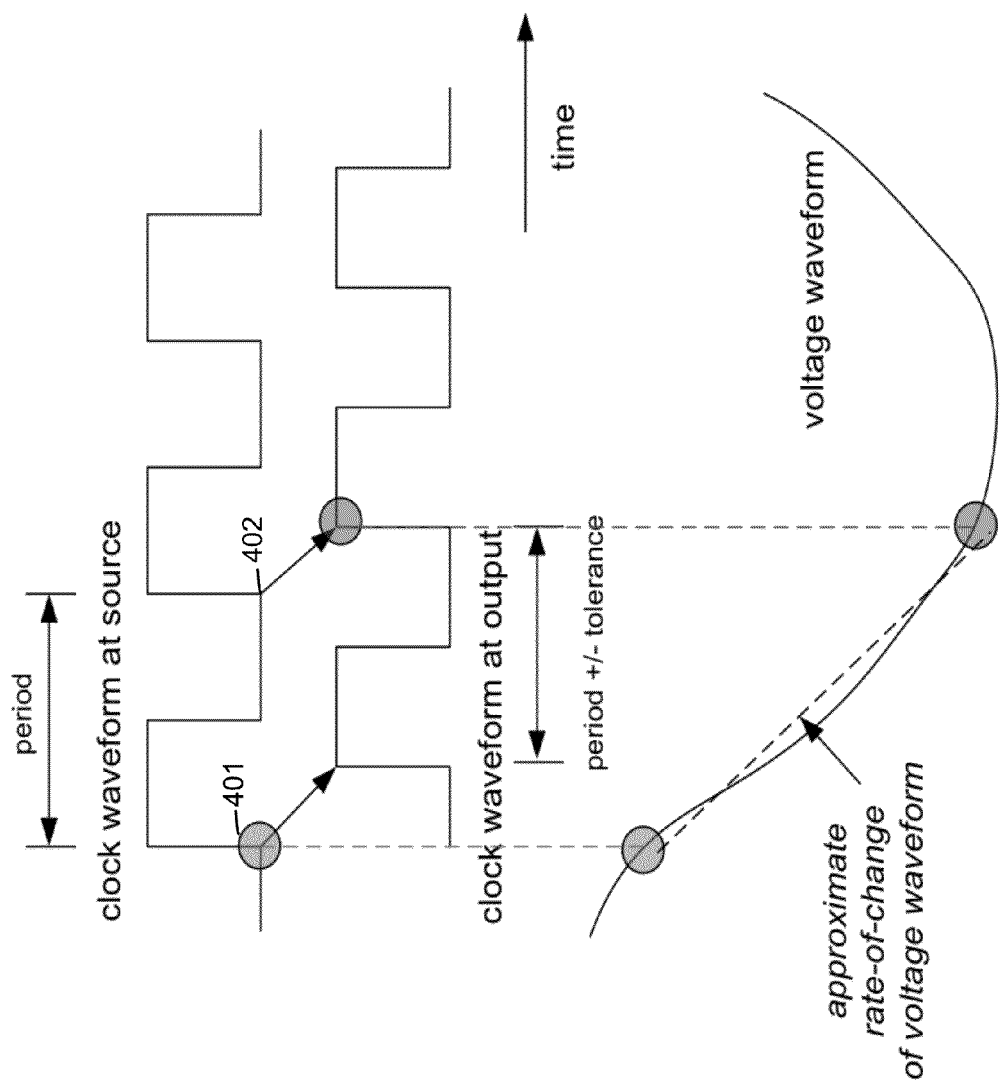
FIG. 4 illustrates an example of slowly varying voltage relative to a clock waveform at a source and a clock waveform at an output according to an embodiment of the present invention.

FIG. 4 illustrates an example of slowly varying voltage relative to a clock waveform at a source and a clock waveform at an output. Slowly varying voltage changes occur over time intervals equal to or longer than the time between events (e.g. clock period) plus path delay. As illustrated in FIG. 4, voltage changes relatively consistently from a time the first signal starts propagating at 401 until the time the second signal arrives at the output 402. For slowly varying voltage, what is primarily of interest is the steepest approximate slope of voltage over the respective time intervals. The maximum rate of change can be determined by performing a "sliding window" analysis of time-domain representations of supply voltage. It should be appreciated that an actual voltage waveform during respective intervals may be used and a maximum rate of change determined may be used from this analysis.

Figure 5:
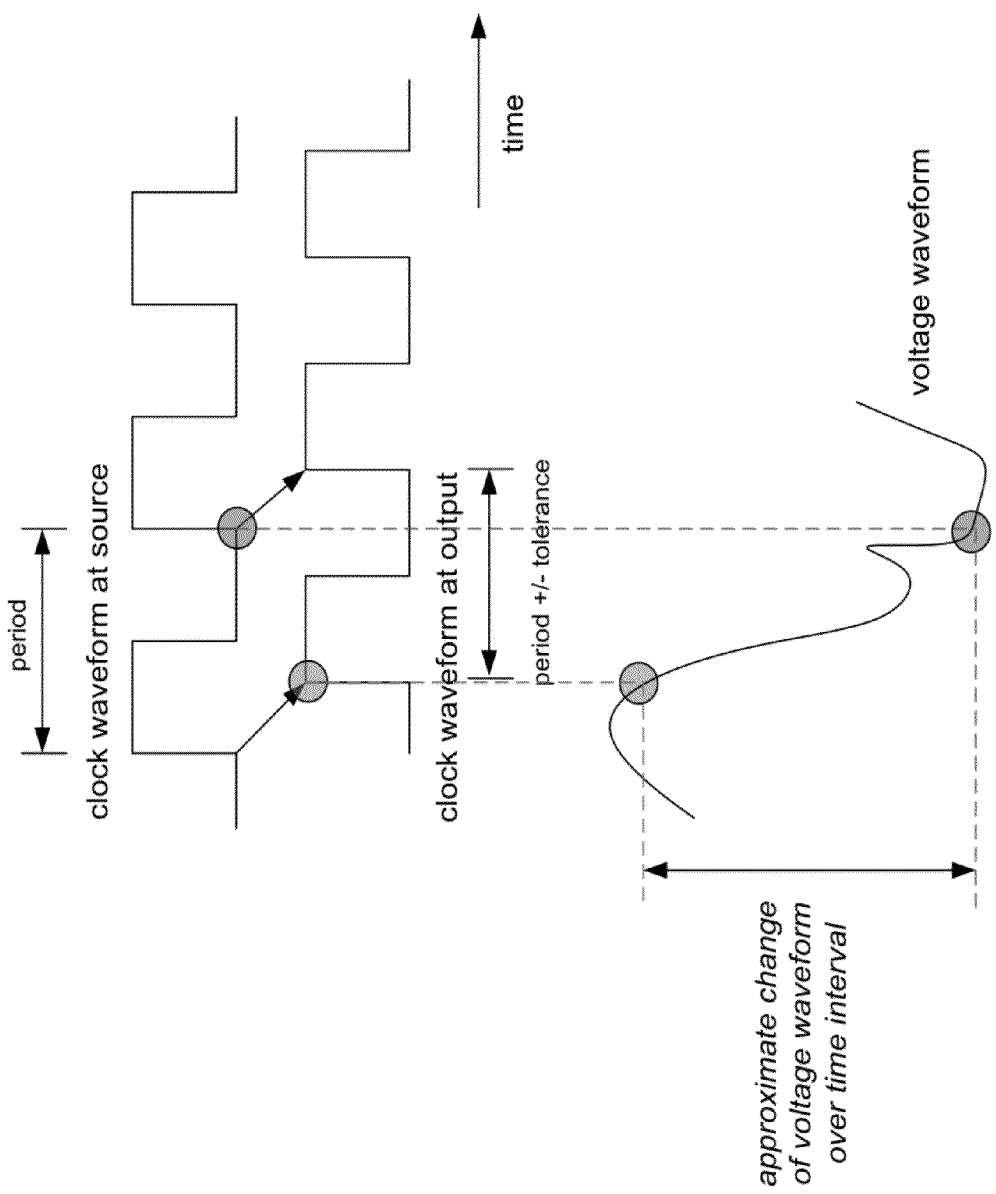
FIG. 5 illustrates a first example of slowly varying voltage relative to a clock waveform at a source and a clock waveform at an output according to an embodiment of the present invention.

FIG. 5 illustrates a first example of a quickly varying voltage relative to a clock waveform at a source and a clock waveform at an output. Quickly varying voltage changes are characterized by complete transitions from one local maximum/minimum in small time intervals. Some embodiments of the present invention may use the actual voltage waveform corresponding to a largest voltage change observed over respective time intervals. Alternatively, quickly varying voltage changes may be succinctly characterized by recording data on a magnitude of a largest change in voltage observed over a respective time interval, provided the complete transition occurs in the length of time from an end of propagation of a first event to a beginning of a propagation of a second event as illustrated in FIG. 5.

Figure 6:
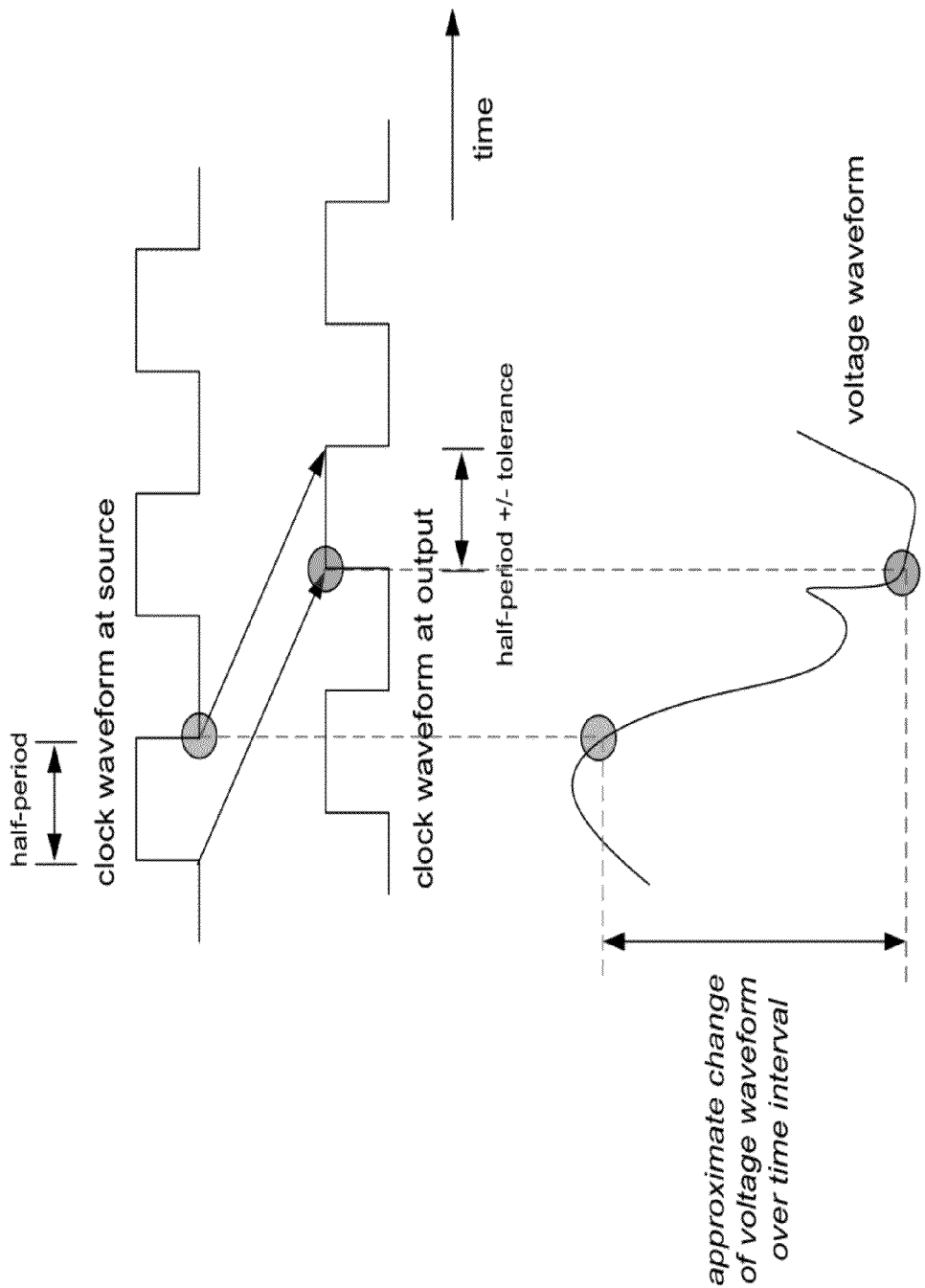
FIG. 6 illustrates a second example of slowly varying voltage relative to a clock waveform at a source and a clock waveform at an output according to an embodiment of the present invention.

FIG. 6 illustrates a second example of quickly vary voltage relative to a clock waveform at a source and a clock waveform at an output. In this example, the quickly varying voltage changes are identified by observing data from a beginning of a propagation of the second event to an end of propagation of the first event.

Once the relevant portions of the voltage waveform or the characteristics to summarize those waveforms are identified, the effect of voltage change on jitter can be simulated or estimated. Both voltage increases and decreases may be separately studied as voltage increases causes push-in and voltage decreases causes push-out. It should be appreciated that the differences may be abstracted away by assuming that push-in and push-out are symmetric.

To compute the effect of a voltage change on jitter, a circuit simulation may be run with the voltage supply varying according to worst case portions of a voltage waveform previously identified. According to an embodiment of the present invention, one or more phase relationships between the signal waveforms and the voltage are identified and are used during analysis. According to an alternate embodiment of the present invention, the phase relationships between the signal waveforms and the voltage are not identified and a conservative phase relationship is used in its place. For slowly transitioning voltage waveforms, an alignment should be such that the voltage should be changing from a time the first signal starts propagating until a time a second signal arrives at an output. For quickly transitioning voltage waveforms, a large voltage change should occur after the end of propagation of the first event, but before the beginning of propagation of the second event. Alternatively, the large voltage change should occur after the beginning of the propagation of the second event but before the end of propagation of the first event. The results of the simulation can be compared with solutions performed with constant supply voltage to determine a change in time difference between the events under study.

Figure 7:
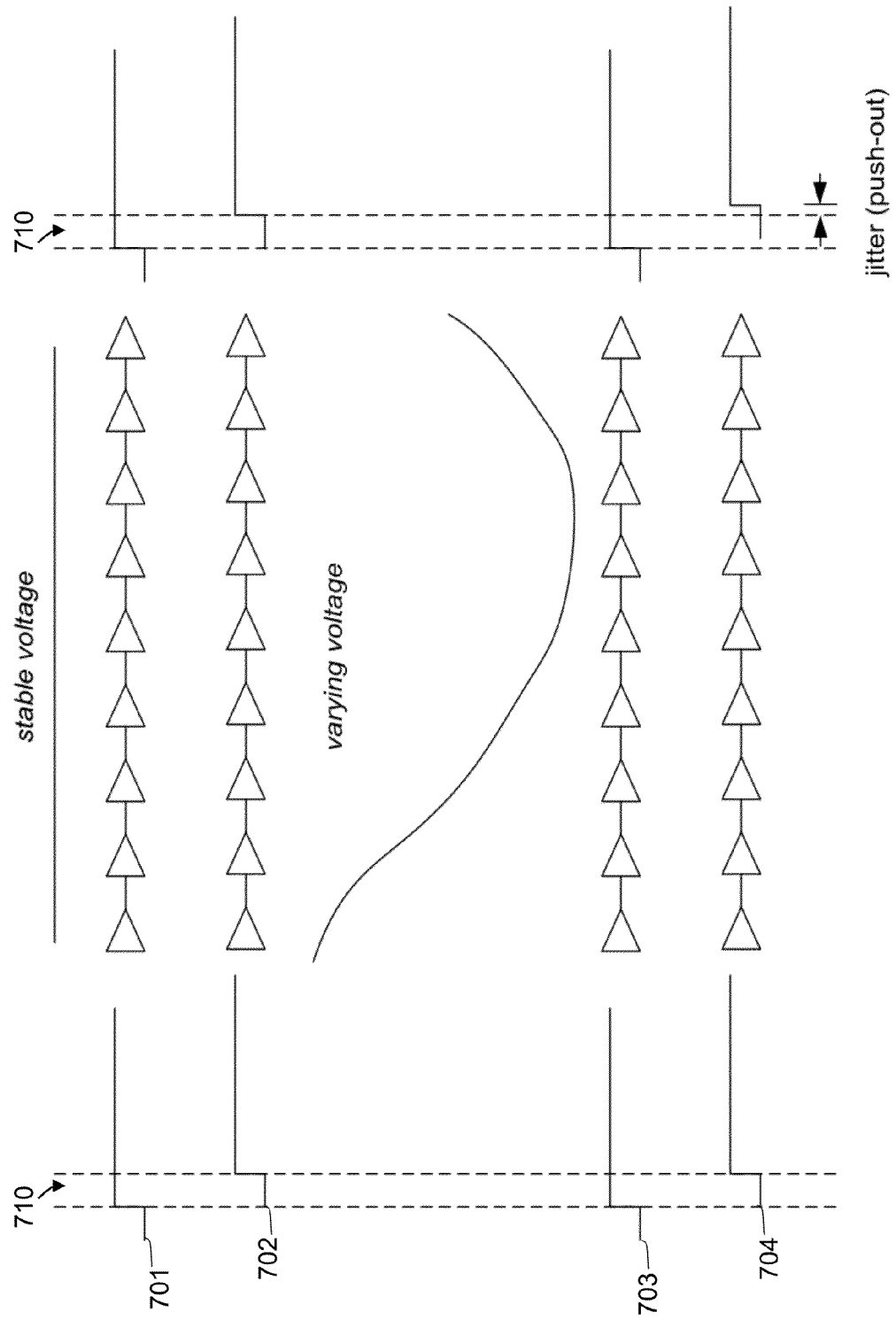
FIG. 7 illustrates an example of jitter pushing out a phase delay between two signals.

FIG. 7 illustrates an example of jitter pushing out (adding to) a phase delay between two signals. Signals 701 and 702 having a phase delay 710 are transmitted along circuitry modeled as a buffer chain. Signals 701 and 702 are transmitted under stable voltage and the phase delay remains the same at the output. Signals 703 and 704 initially have the same phase delay 710. However, signals 703 and 704 are transmitted under varying voltage. At the output, the phase delay between signals 703 and 704 are pushed out.

Another method for computing the effect of voltage change on jitter involves abstracting away circuit details and estimating a relative speed of propagation at different points along signal paths. This may be achieved by first considering the time two signals arrive at each point along the signal path(s), the supply voltage at each of those time instants, and the respective delays implied by those supply voltages and the respective sensitivities of the points along the path(s).

Figure 8:
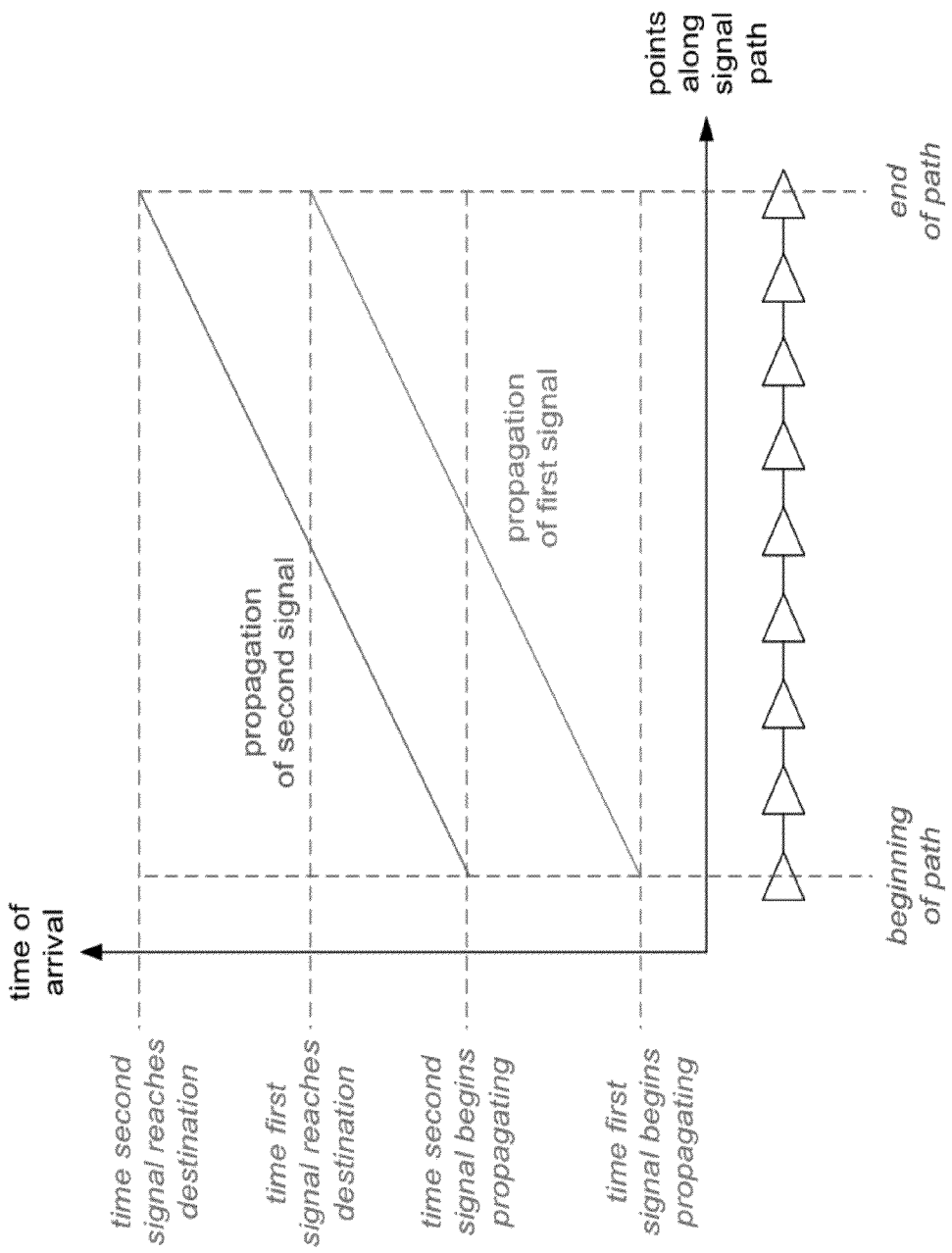
FIG. 8 is a plot illustrating a time of arrival of two signals on points along a signal path according to an embodiment of the present invention.

FIG. 8 is a plot illustrating a time of arrival of two signals on points (elements) along a signal path. According to an embodiment of the present invention, a simplifying assumption may be made that the points or elements considered by the analysis have approximately equal delay. This assumption does not necessarily limit generality since delays of physical elements may be divided to correspond with elements assumed for this analysis.

Figure 9:
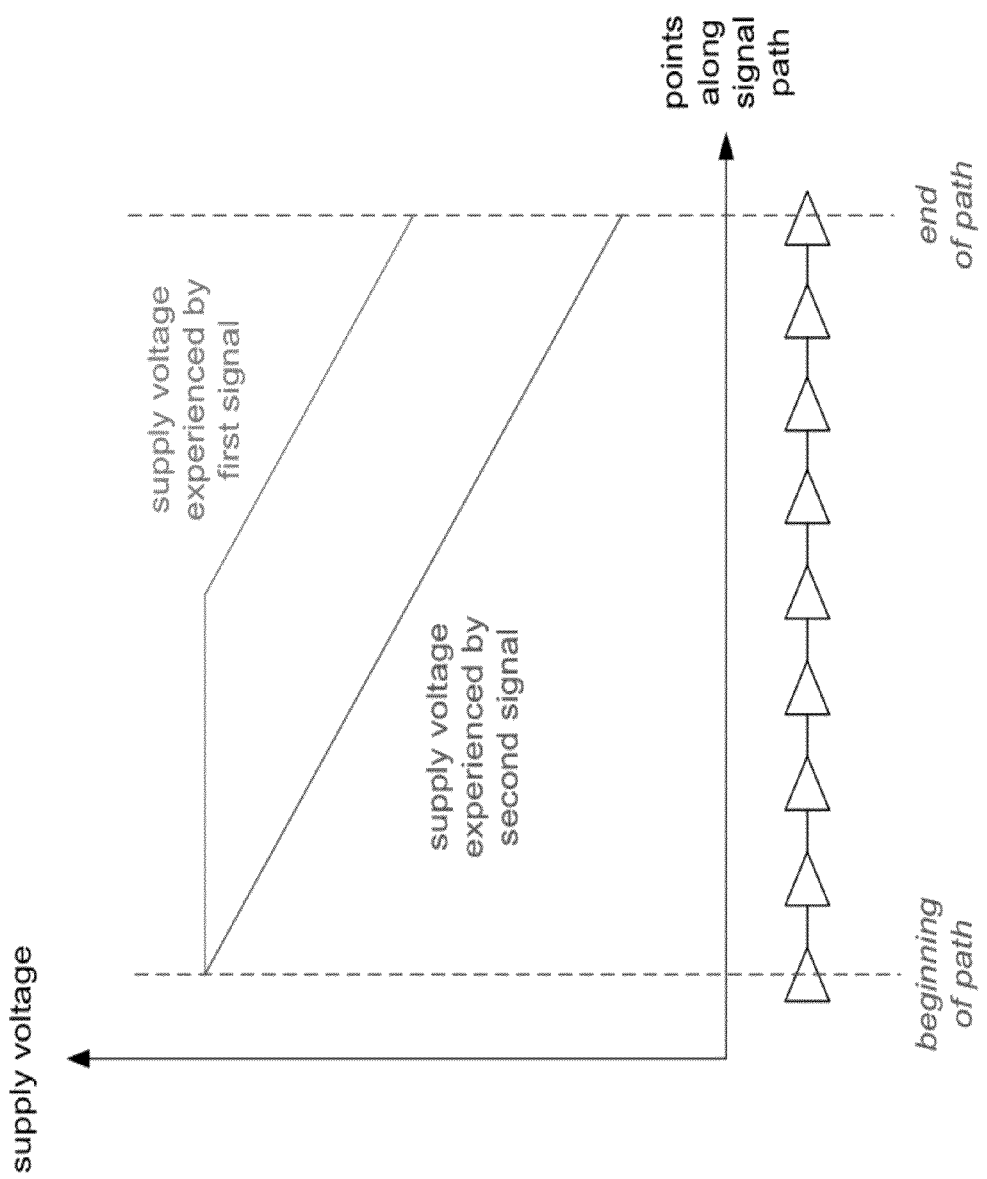
FIG. 9 is a plot illustrating a supply voltage of two signals on points along a signal path according to an embodiment of the present invention.

FIG. 9 is a plot illustrating a supply voltage of two signals on points along a signal path. The plot of a voltage function in FIG. 9 may be derived from the plot illustrated in FIG. 8. Using information about what time a signal reaches a point on the signal path and the voltage at any point of time, a graph of voltage level at any given point may be generated.

Figure 10:
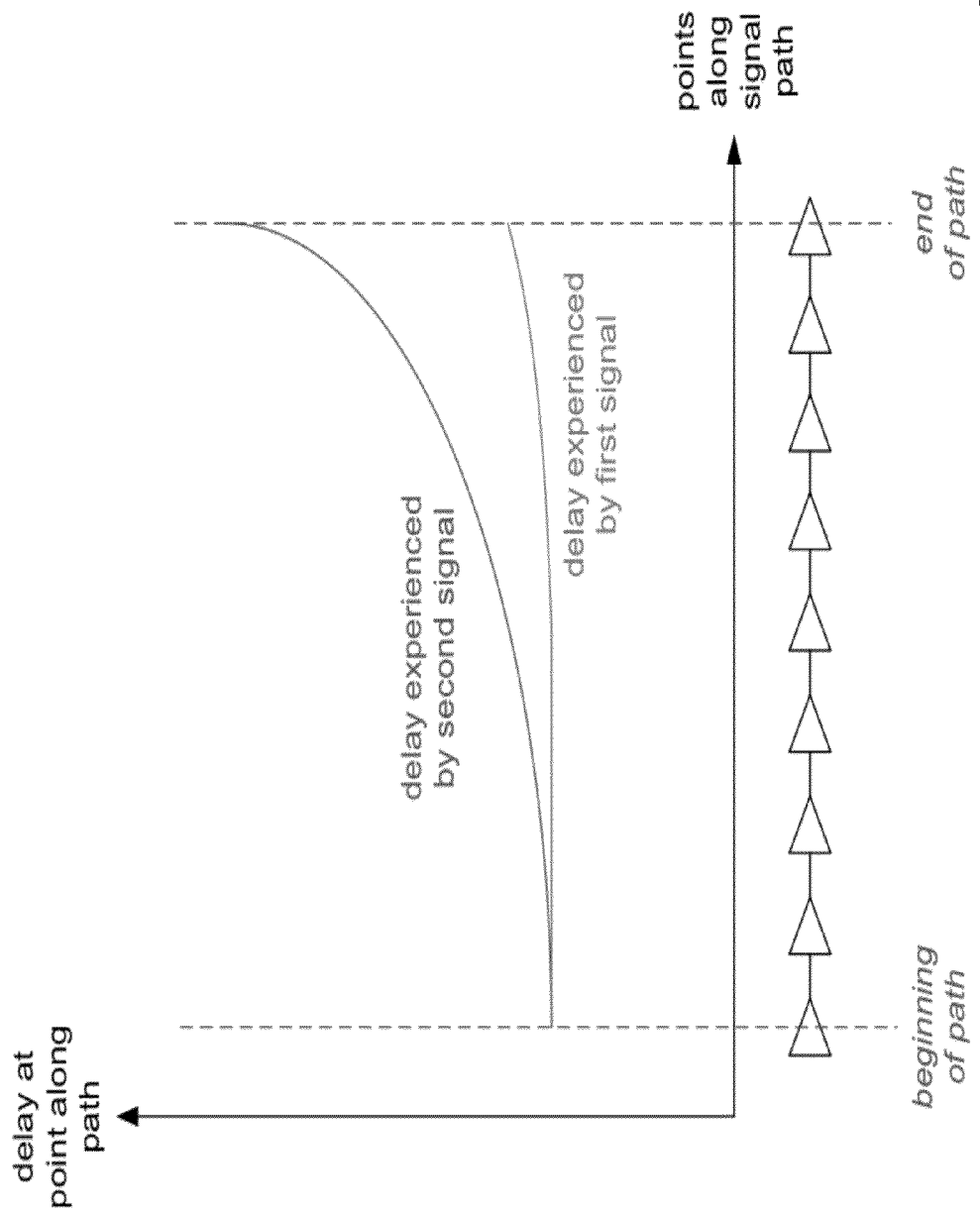
FIG. 10 is a plot illustrating a delay of two signals on points along a signal path according to an embodiment of the present invention.

FIG. 10 is a plot illustrating a delay per element of two signals on points along a signal path. The plot of the delay per element function may be derived from the plot illustrated in FIG. 9.

It should be appreciated that the time the signals arrive at each point along the signal path(s) is a function of the delays seen by those signals. Therefore, there is a circular dependency between the plots illustrated in FIGS. 8-10. Consequently, embodiments of the present invention may use incremental time steps to sequentially determine the aforementioned arrival times, supply voltages, and path delays for subsequent points along the signal paths. Alternatively, other embodiments may rely on assuming the relationship between signal arrival time and element delays is second-order and can be ignored since the effect of operating condition changes on path delays over the time intervals of interest is usually small in well designed systems.

Delay versus path element may be directly used to compute the difference in path delays experienced by the two signals. The difference in path delays computed for the set of changing voltage conditions, determined according to the techniques described yields the jitter of the second signal with respect to the first signal. The difference in path delay is the area between the two curves in FIG. 10 shaded in FIG. 11.

Figure 12:
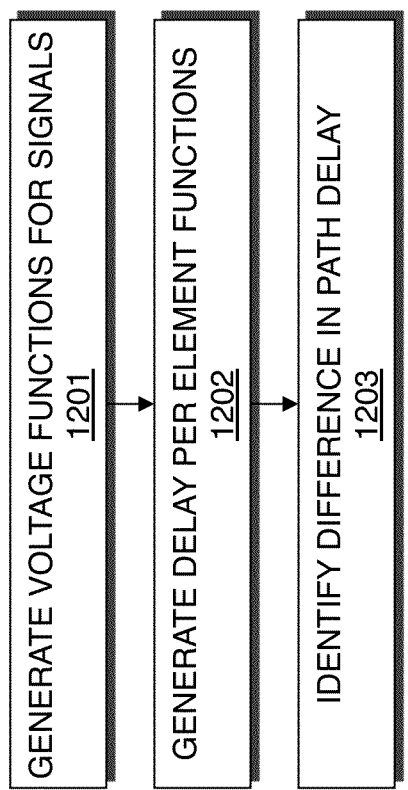
FIG. 12 is a flow chart illustrating a method for modeling jitter according to an embodiment of the present invention.

FIG. 12 is a flow chart illustrating a method for modeling jitter according to an embodiment of the present invention. At 1201, a voltage function is generated for each signal being analyzed. The voltage function describes an amount of voltage at a point (element) along a path of the signal. According to an embodiment of the present invention, the voltage function for a signal is generated by taking into account a time the signal arrives at points along a signal path and a supply voltage at each of the times. FIG. 9 illustrates supply voltage functions generated for two signals.

At 1202, a delay per element function is generated for each signal being analyzed. The delay per element function for a signal describes an amount of delay associated with a particular element. According to an embodiment of the present invention, the delay per element function for a signal is generated by applying a delay per voltage function to the voltage function generated at 1201. FIG. 10 illustrates delay per element functions generated for two signals.

Figure 11:
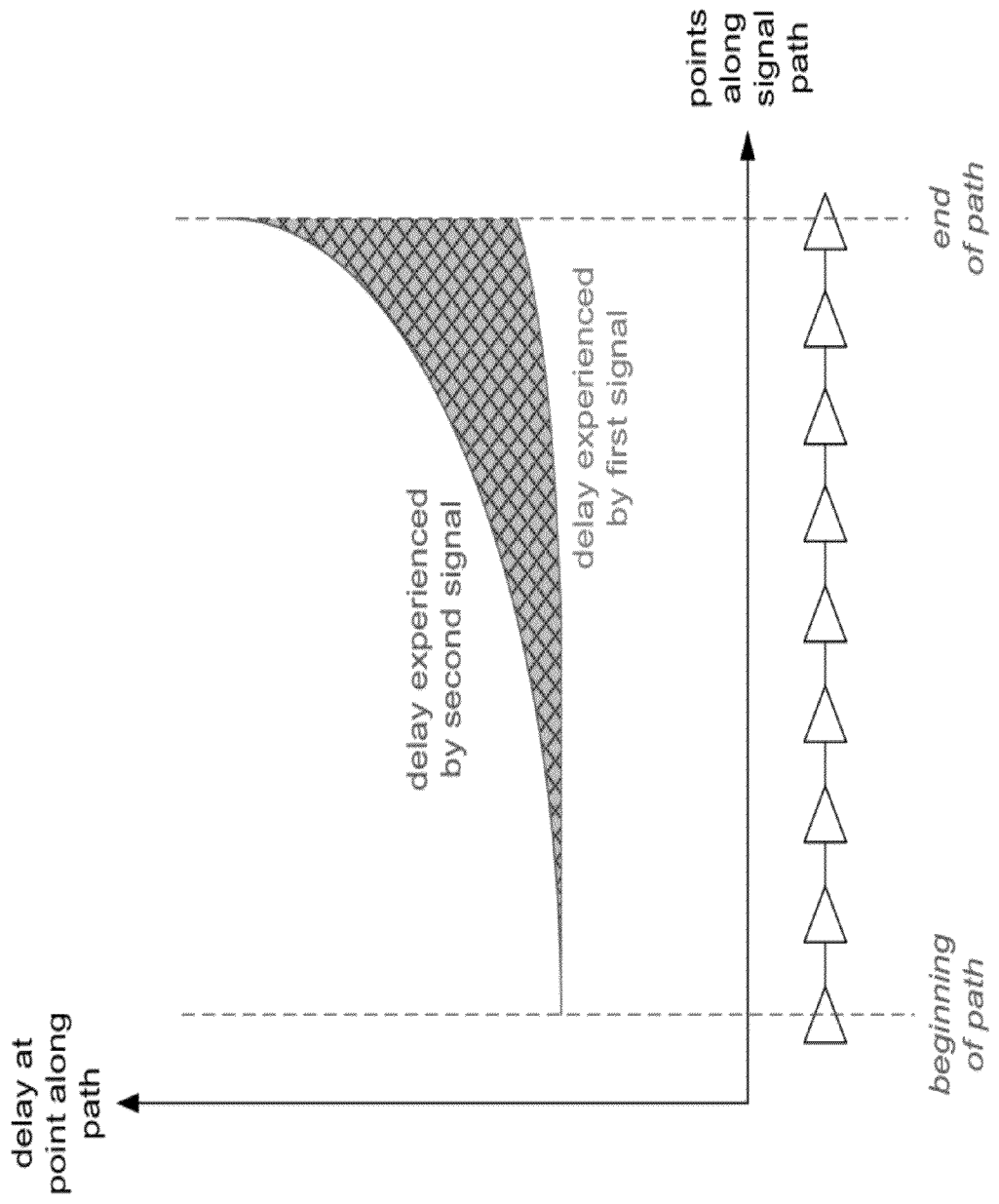
FIG. 11 is a plot illustrating the difference in the delay of two signals on points along a signal path according to an embodiment of the present invention.

At 1203, a difference in path delay between delay per element functions is identified. According to an embodiment of the present invention, identifying the difference in path delay between delay per element functions is performed by integrating the two functions. The hashed area between the two delay per element functions in FIG. 11 represents the difference in path delay. This difference may be designated as the jitter modeled.

It should be appreciated that embodiments of the invention may further simplify the jitter model described with reference to FIGS. 8-12 based on assumptions about the delay as a function of voltage and voltage as a function of time, so that delay per element changes regularly along the signal path and the delay per element changes are similar across elements. This allows the following relationships regarding jitter to be made.

For quickly varying voltage and relatively long path delays compared to a phase offset between events, jitter can be approximated as the delay difference per element from a local minimum voltage to a local maximum voltage multiplied by a number of elements traversed in a time interval between two signals or events. The following relationship may be established.

$$\text{jitter push-in or push out} = (\text{max delay per element} - \text{min delay per element}) \times (\text{phase offset between events measured in elements}) = (\% \text{ delay difference between voltage extremes}) \times (\text{phase offset between events}) \quad (1)$$

Figure 13:
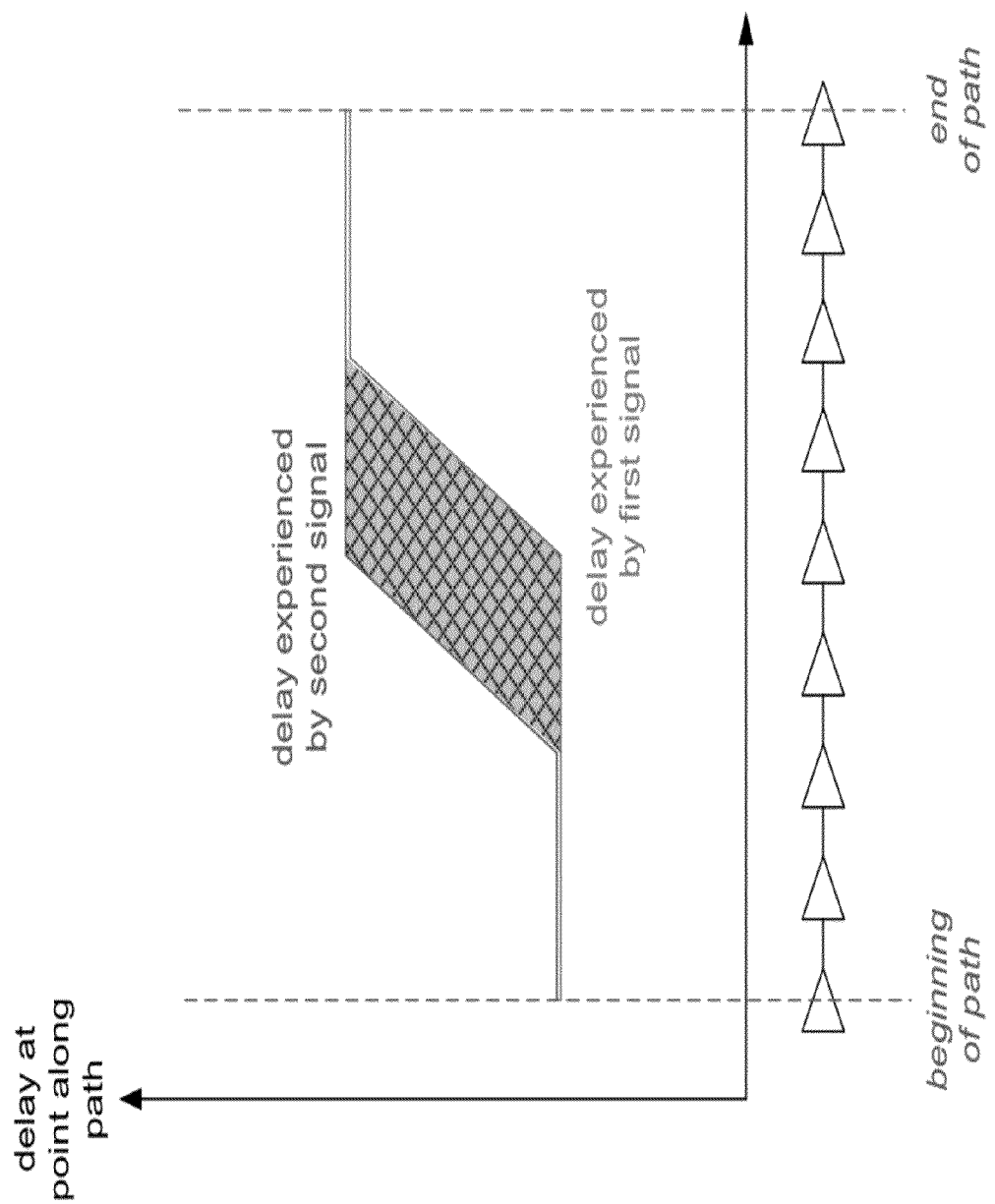
FIG. 13 is a plot illustrating a delay of two signals on points along a signal path where the signals are being transmitted during quickly varying voltage with relatively long path delays compared to the phase offset between events according to an embodiment of the present invention.

FIG. 13 is a plot illustrating a delay per element of two signals on points along a signal path where the signals are being transmitted during quickly varying voltage. In this example, the voltage change occurs in a time interval after the second signal starts traversing the path and before the first signal finishes traversing the path.

For quickly varying voltage and relatively short path delays compared to a phase offset between events, jitter can be approximated as the delay difference per element from a local minimum voltage to a local maximum voltage multiplied by a number of elements in the path. The following relationship may be established.

$$\text{jitter push-in or push out} = (\text{max delay per element} - \text{min delay per element}) \times (\text{number of path elements}) = (\% \text{ delay difference between voltage extremes}) \times (\text{path delay}) \quad (2)$$

Figure 14:
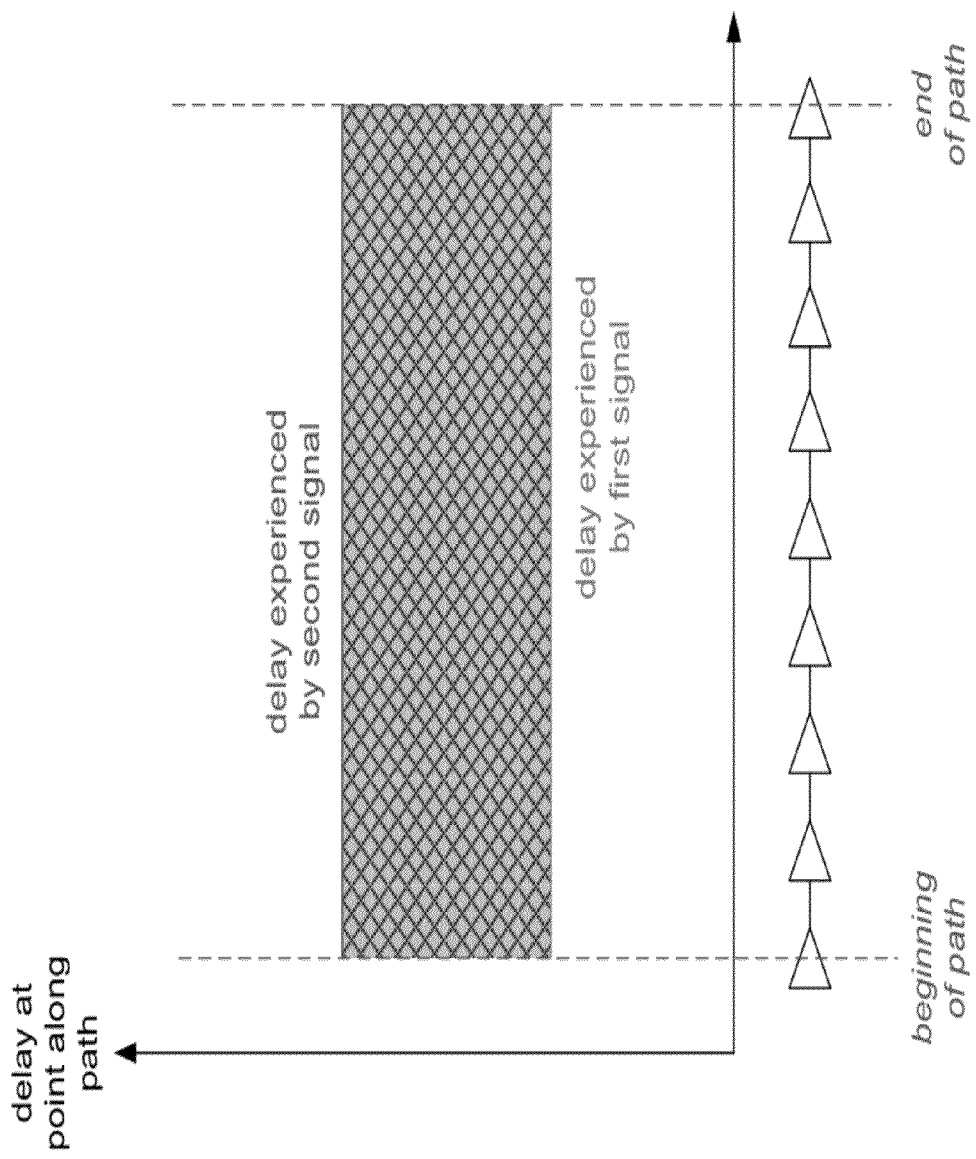
FIG. 14 is a plot illustrating a delay of two signals on points along a signal path where the signals are being transmitted during quickly varying voltage with relatively short path delays compared to the phase offset between events according to an embodiment of the present invention.

FIG. 14 is a plot illustrating a delay per element of two signals on points along a signal path where the signals are being transmitted during quickly varying voltage. In this example, the voltage change occurs in a time interval after the first signal finishes traversing the path and before the second signal starts traversing the path.

It should be appreciated that the two relationships for quickly varying voltages may be combined and be expressed by the following relationship.

jitter push-in or push out=(% delay difference between voltage extremes)×min(path delay, phase offset between events) (3)

For short path delays, the maximum jitter accumulation is limited by the length of the path and how much delay change due to voltage can occur. A zero delay path cannot accumulate jitter. For longer path delays, both signals will be propagating as the voltage change occurs and similar delay sensitivities of elements will act to bound how much jitter accumulates due to the phase offset between the events and how much delay change due to voltage can occur. Two events that are not offset in time are not subject to jitter accumulation.

For slowly varying voltage, jitter can be approximated as the delay difference per element accumulated over the length of time equal to the phase offset between events multiplied by the number of elements in the path. The following relationship may be established.

jitter push-in or push out=(rate of change in the delay difference per element)×(phase offset between events)×(number of path elements)=(rate of change of the % delay difference)×(phase offset between events)×(path delay) (4)

Figure 15:
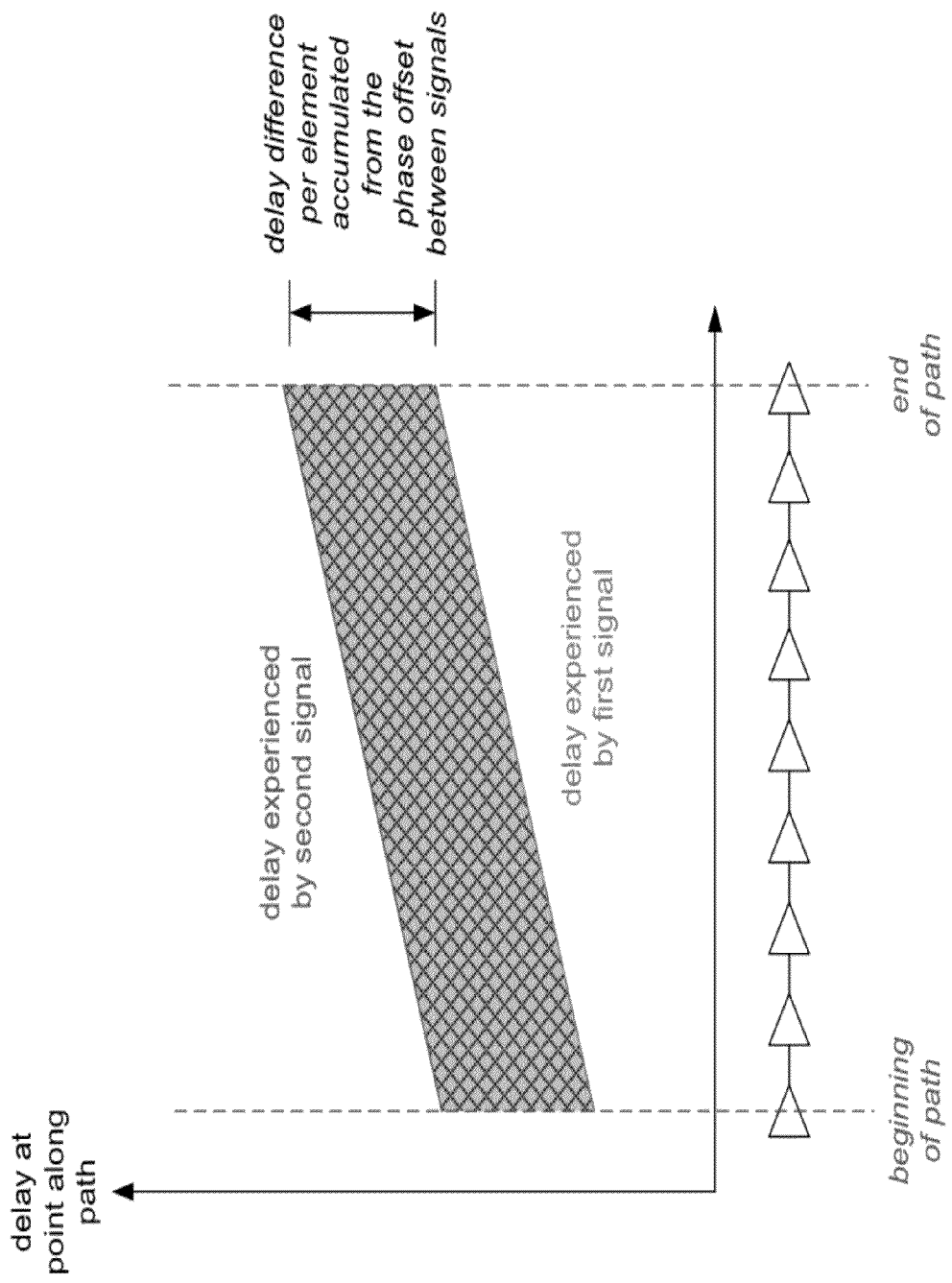
FIG. 15 is a plot illustrating a delay of two signals on points along a signal path where the signals are being transmitted during slowly varying voltage according to an embodiment of the present invention.

FIG. 15 is a plot illustrating a delay per element of two signals on points along a signal path where the signals are being transmitted during slowly varying voltage. In this example, it is assumed that path element delay as a function of time, d(t), is as follows:

$$d(t)=d(t\text{-phase offset})+c \quad (5)$$

This means that the same difference in delay applies to all points along the path. A degenerate example of this type of delay change versus time is the linearly changing delay shown in the example.

The approximations described have assumed that both events (signals) under study experience the same delays under non-varying voltage and temperature conditions. This is true if both signals are traversing the same path elements. In the case of comparing rising and falling clock edges, however, the two paths are no longer identical because different transistors are active for each of those edges. In general, the more dissimilar the paths are, the more likely the respective paths will have different delays at some process, voltage, and timing (PVT) corner even if they have identical delays at other PVT corners. Paths can be dissimilar because P and N transistor characteristics are mostly independent. Paths can also be dissimilar because transistors that are physically further apart can differ more (threshold voltage and mobility) than transistors that are nearby each other. The uncommon portions of branching topologies can differ as a function of physical distance between the branches. Paths can also be dissimilar because metal dominated paths behave differently than logic dominated paths.

Different variation characteristics (or sensitivities) mean that the relative delay of two signal paths will differ across PVT. For example, one path may speed up more than the other path at higher voltages. These changes in relative delays need to be accounted for when trying to determine the total uncertainty in the time between two signals (events).

The relative time between two signals may be affected by both: (i) varying voltage, which means one signal will see somewhat different voltage conditions than the other signal even given nominally identical paths, and (ii) different delay sensitivities of paths that manifests as different delay changes across voltage and temperature conditions even if these condition change so slowly that any two events being compared experience essentially identical conditions. According to an embodiment of the present invention, both of these conditions may be taken into account in the modeling of jitter due to changing voltage and temperature. Calibration techniques based on programmable delays may be used to compensate for process variation.

To characterize delay change differences between paths, simulations may be run on relevant paths or measurements taken comparing how the relative delays vary across PVT or VT. By simulating the actual paths, effects such as metal dominated or logic dominated paths will be captured. By simulating various process corners, P skew versus N skew will be captured. To model effects such as differences in threshold voltage and mobility across die, and the impact of these differences on relative path delays, some embodiments will consider a variety of different assumptions of threshold voltage and mobility for the two paths being analyzed within the constraints of how much on die variation can occur in silicon. After delay change differences are simulated for paths of interest, the differences may be reduced to a multiplier of path delay. As an example, in some embodiments, the following relationship may be used to estimate the total relative delay uncertainty between two signals going through distinct paths under slowly varying voltage conditions. The relationship assumes symmetric push-in and push out.

relative delay uncertainty=2×[(rate of change of the % delay difference)×(phase offset between events)× (path delay)+(% delay change difference due to sensitivity mismatch)×(path delay)] (6)

Figure 16:
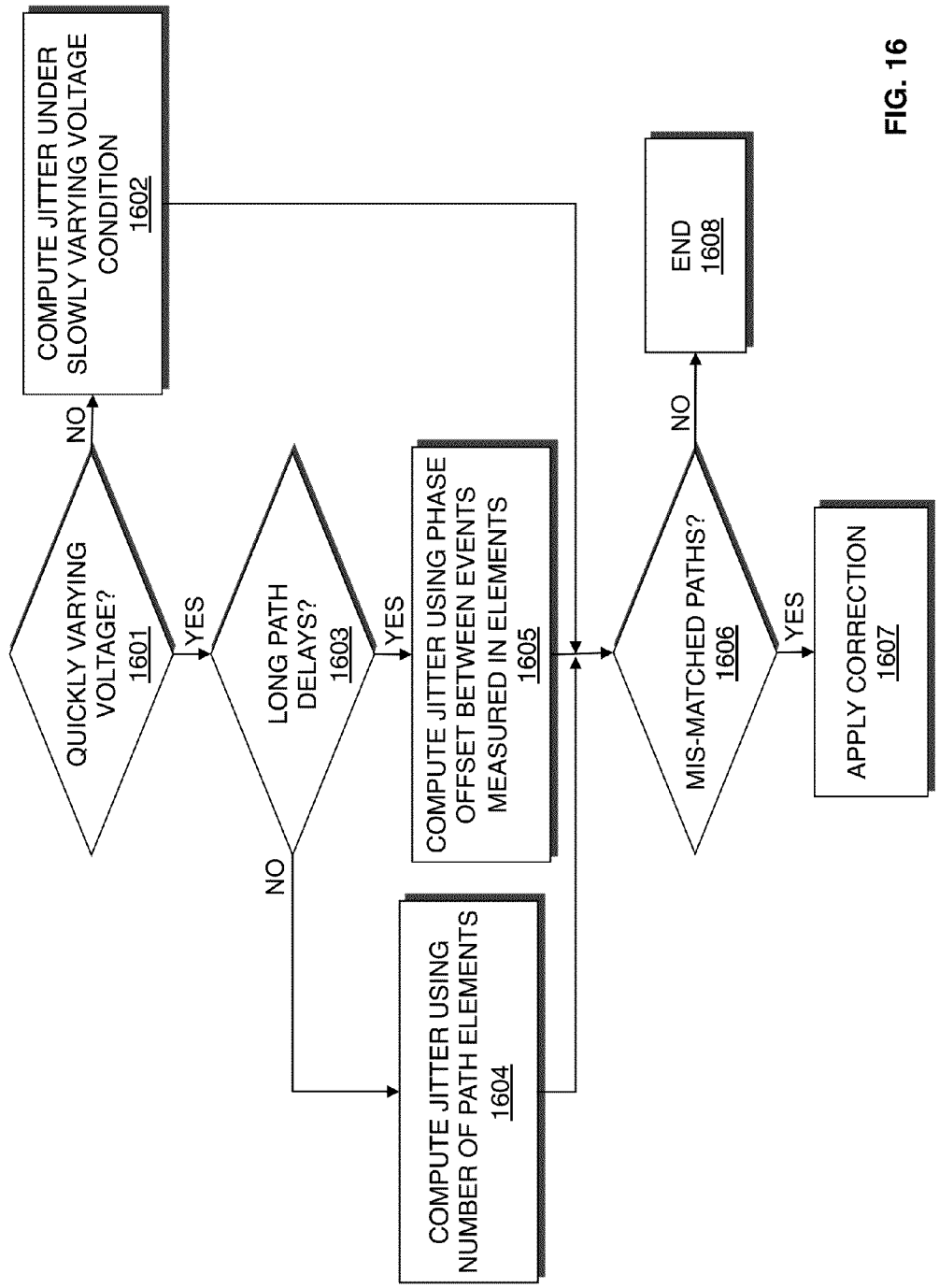
FIG. 16 is a flow chart illustrating a method for modeling jitter according to a second embodiment of the present invention.

FIG. 16 is a flow chart illustrating a method for modeling jitter according to a second embodiment of the present invention. At 1601, it is determined whether signals are being transmitted under quickly varying voltage conditions. Control proceeds to 1602 in response to determining that the signals are not being transmitted under quickly varying voltage conditions. Control proceeds to 1603 in response to determining that the signals are being transmitted under quickly varying voltage conditions.

At 1602, jitter is modeled for slowly varying voltage. According to an embodiment of the present invention, jitter is approximated as the delay difference per element accumulated over a length of time equal to a phase offset between events multiplied by a number of elements on a path and modeled using relationship (4).

At 1603, it is determined whether the signals are experiencing long path delays compared to a phase offset between events. According to an embodiment of the present invention, this determination can be made by comparing the properties of the signals described with reference to FIGS. 5 and 6. Control proceeds to 1604 in response to determining that signals are not experiencing relatively long path delays. Control proceeds to 1605 in response to determining that signals are experiencing relatively long path delays.

At 1604, jitter is approximated as the delay difference per element from a local minimum voltage to a local maximum voltage multiplied by a number of elements in the path and modeled using relationship (2).

At 1605, jitter is approximated as the delay difference per element from a local minimum voltage to a local maximum voltage multiplied by the number of elements traversed in the time interval between the two signals and modeled using relationship (1).

At 1606 it is determined whether the signals are transmitted on mis-matched paths. According to an embodiment of the present invention, mis-matched paths may include paths that have differing characteristics across PVT. The paths may have differing components, component spacing, material make up, or other differing characteristics. Control proceeds to 1607 in response to determining that the signals are transmitted on mis-matched paths. Control proceeds to 1608 in response to determining that the signals are not transmitted on mis-matched paths.

At 1607, modeling of the jitter applies a correction to account for the mis-matched paths.

At 1608, control terminates the procedure.

When modeling jitter within a single power supply domain, the impact of supply noise on timing transfers may be considered. A power supply domain may include all gates, buffers, and other components making up the source clock path, data path, and destination clock path powered by a supply. Traditionally, static timing analysis is used to assess whether timing is satisfied. Static timing analysis may be performed over a number of timing corners which represent worst-case combinations of PVT. Static timing analysis, however, is not conservative in the sense that changing conditions may produce combinations of path element delays that are not seen at any of the timing corners.

Correlations exist between clock and data paths that act to cancel the delay impact of time-varying voltage. There can be benefit to setup margin under well-characterized voltage variation patterns. Custom circuit design strategies have been used to improve setup margin by exploiting signal-path correlations. However, programmable devices may be subject to more varied supply noise patterns because of a variety of designs and data patterns they are exposed to. Consequently, designers working on programmable devices tend to rely more on static timing analysis to conservatively predict timing failures.

Figure 17:
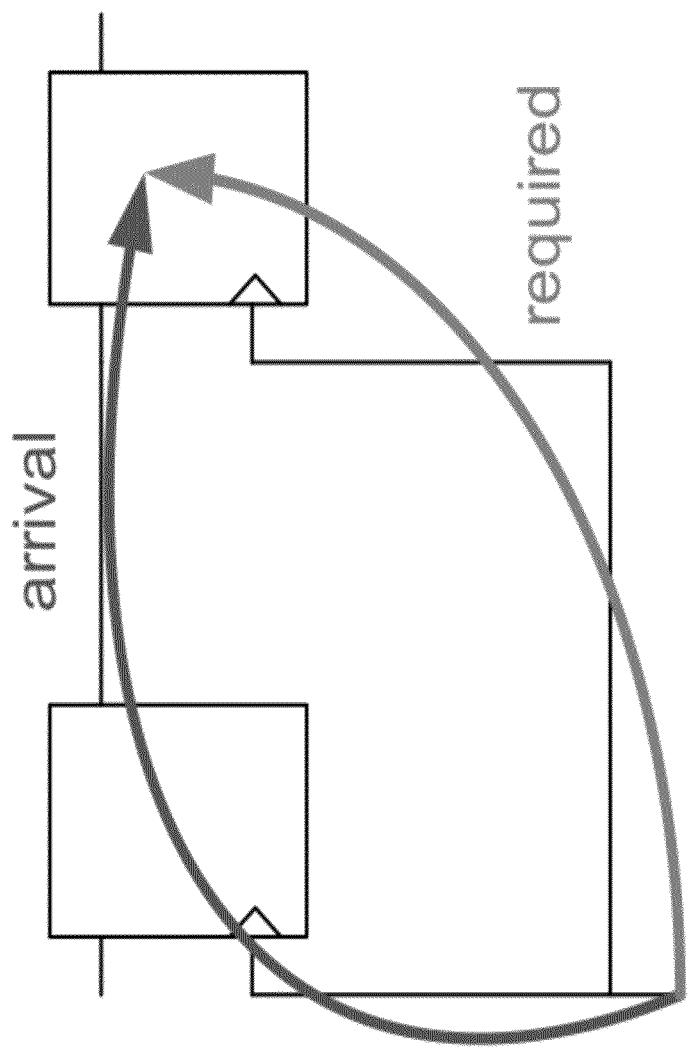
FIG. 17 illustrates an example of timing transfer which shows arrival and required paths relevant to static timing analysis according to an embodiment of the present invention.

FIG. 17 illustrates an example of timing transfer which shows an arrival and required path relevant to static timing analysis. The following conditions must be satisfied in order to meet setup and hold timing requirements.

Figure 18:
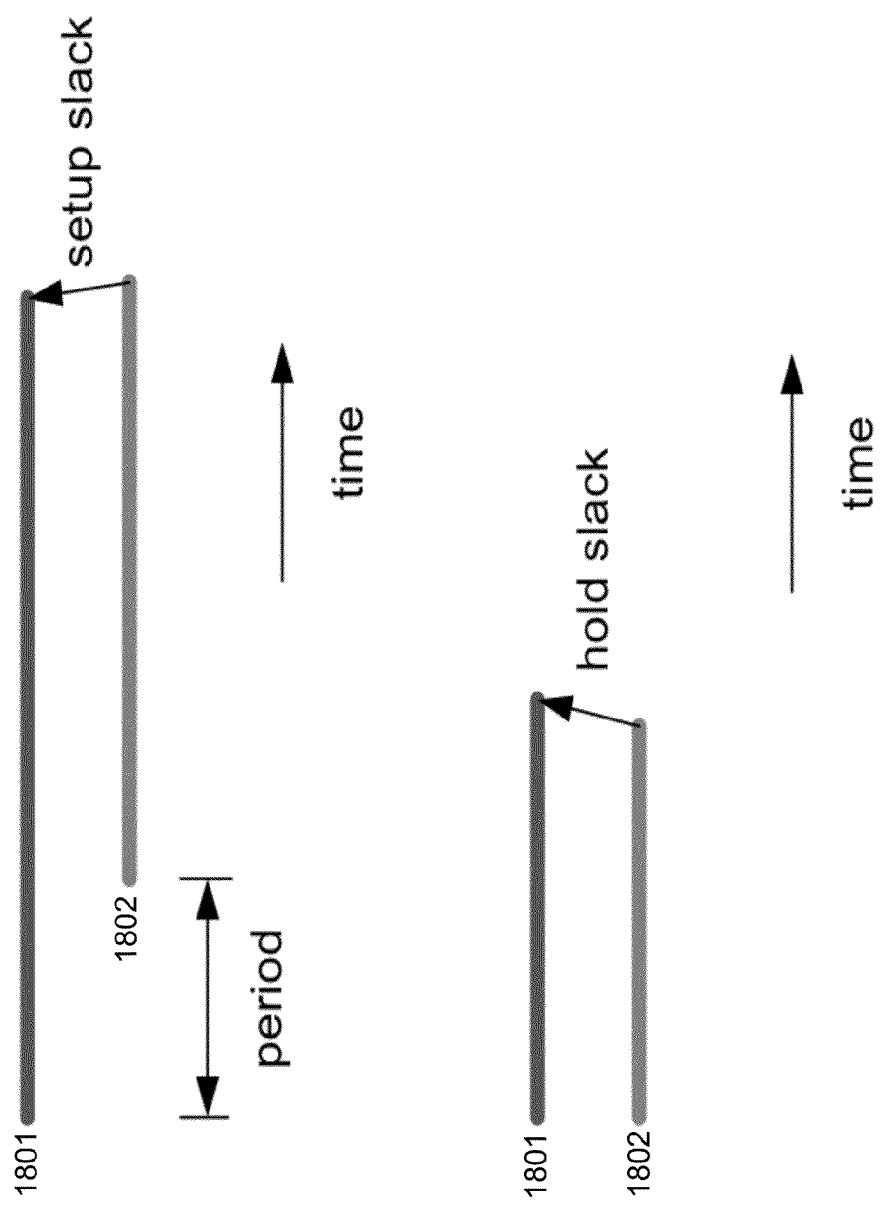
FIG. 18 illustrates an example of critical arrival path and required path races versus time depicted for both setup and hold relationships according to an embodiment of the present invention.

> max arrival path delay+register $t_{su}$<min required path delay+setup phase relationship > min arrival path delay>max required path delay+register hold+hold phase relationship FIG. 18 illustrates an example of critical (low-slack) arrival path 1801 and required path 1802 races versus time depicted for both setup and hold relationships. The setup race is depicted based on analysis at worst-case "slow conditions". The hold race is depicted based on analysis at worst-case "fast conditions". As illustrated, a reasonably substantial portion of the required path elements experience the same voltage and temperature conditions as elements on the arrival path. This correspondence indicates that these two paths will experience similar delay changes.

Figure 19:
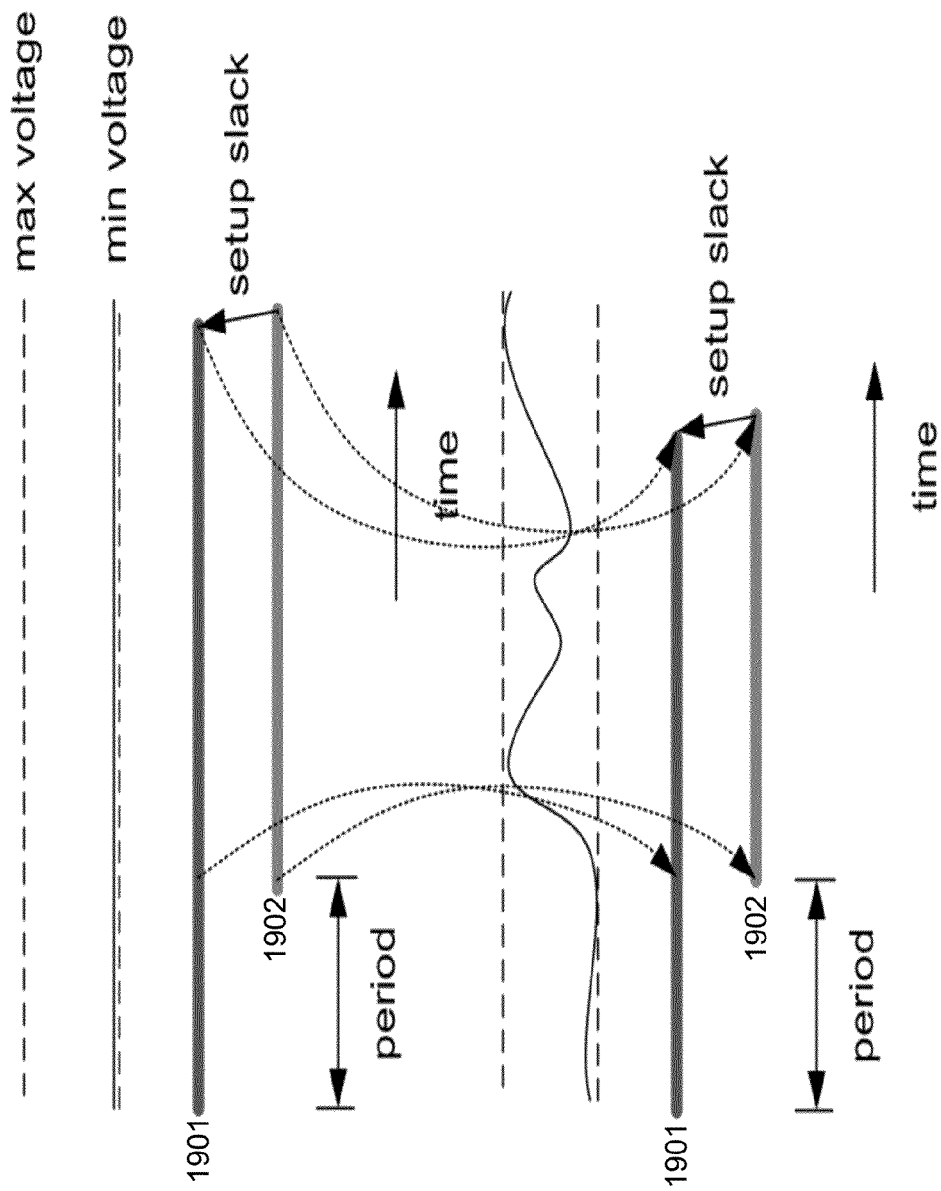
FIG. 19 illustrates an example where corresponding arrival path and required path 1902 elements have identical sensitivities to voltage and temperature, and operating conditions change during the respective time interval according to an embodiment of the present invention.

FIG. 19 illustrates an example where corresponding arrival path 1901 and required path 1902 elements have identical sensitivities to voltage and temperature, and operating conditions change during the respective time interval. As illustrated, margins are generally unaffected because both arrival and required time with change similarly. Power supply fluctuations above minimum voltage speed up both arrival and required paths resulting in setup slack being roughly unchanged.

FIG. 20 illustrates a typical setup analysis performed at a worst slow corner, a typical setup analysis performed at a worst fast corner, and a setup analysis assuming voltage transients. If the elements on the required path 2002 are more sensitive to voltage than the corresponding elements on the arrival path 2001 and if conditions were to change in the respective time intervals, timing violations may occur that a standard corner analysis would not detect. The worst voltage pattern for setup is to have low voltage conditions until the required propagation starts to maximize delay through the arrival path (minimize signal propagation progress through the arrival path) during that time interval. Once the required propagation starts, the voltage pattern which maximizes "arrival element delay−required element delay" at each instant is the worst case pattern. As illustrated in FIG. 20, where the required path is more sensitive to voltage, maximum voltage conditions are assumed for that interval to be conservative. Even though that decreases path delays, a setup violation is caused by a greater decrease in the required path delay.

In order to ensure timing analysis is conservative, the relative delay sensitivities to operating condition changes of elements on the arrival and required paths need to be determined. This can be done by simulating or measuring the respective paths under a variety of voltage and temperature conditions, similar to what was done to determine delay change differences between paths for computing total uncertainty. Once the delay changes across operating conditions for each path element type are determined, an upper bound on arrival-versus-required-path delay change difference can be computed. It should be appreciated that the differences may be data-reduced so that the worst case difference is recorded for each required path element, independent of arrival path. The differences may be further data-reduced to a multiplier of path delay so that a subset of path elements will share the same multiplier. Whether or not data reduction is performed, the setup (slow corner) and hold analysis (fast corner) will be modified as follows to ensure conservatism.

> Max arrival path delay+register $t_{su}$<min required path delay−path delay change difference+setup phase relationship, if setup phase relationship>0

> Min arrival path delay>max required path delay+path delay change difference+register $t_h$+hold phase relationship, if hold phase relationship>0

The "path delay change difference" can be arrival-required-path-specific, required-path-specific, or a fraction of required path delay, depending on the data-reduction performed. In the case of negative setup/hold phase relationships, it is the arrival path that needs to be processed rather than the required path because for those phase relationships, the arrival path will be the shorter of the two. So the majority of voltage changes affecting it will affect the required path.

FIG. 21 is a chart illustrating a summary of how adjustments may be made to path delays as a function of phase relationship, timing corner, and analysis type.

Figure 22:
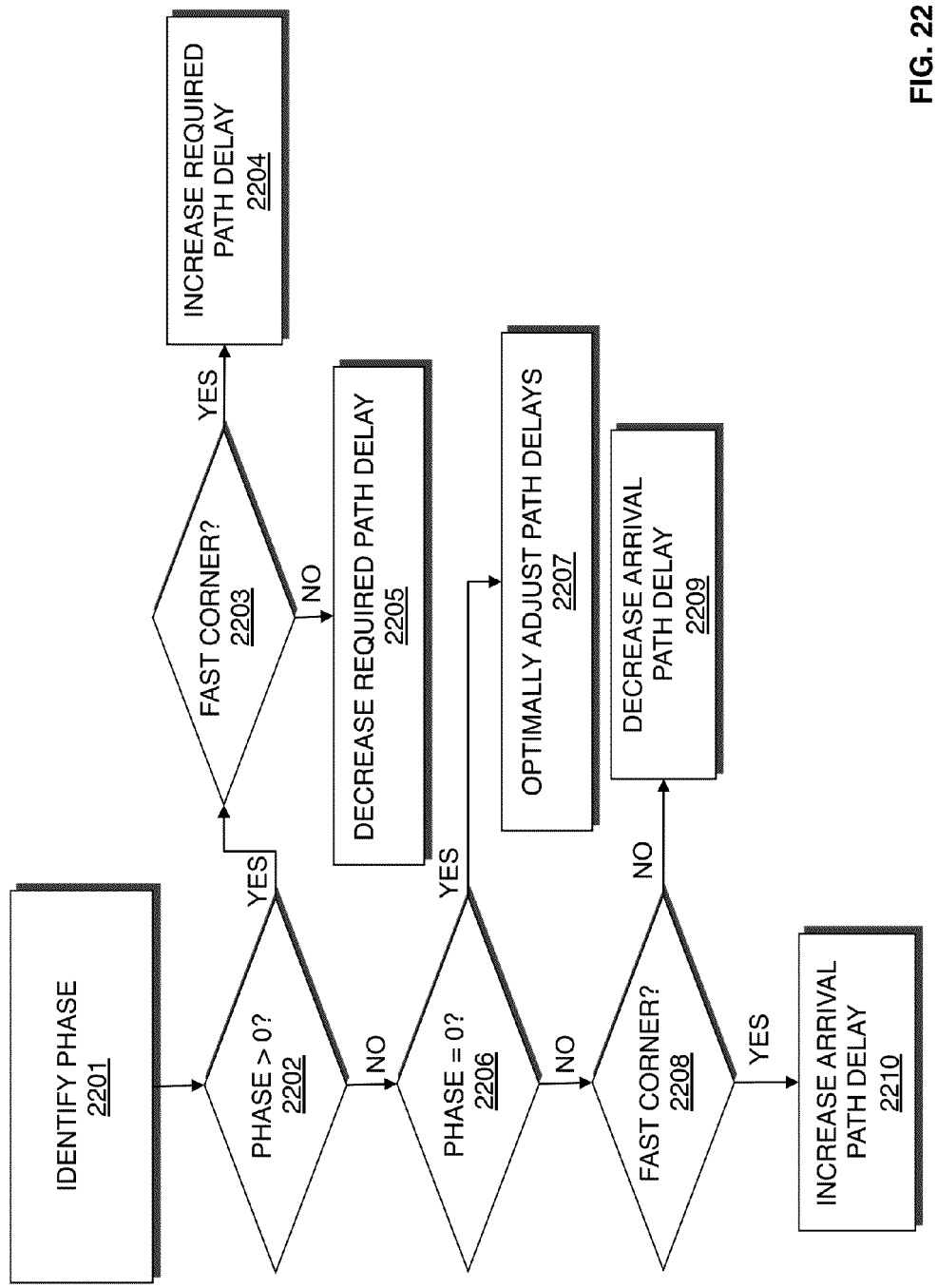
FIG. 22 is a flow chart illustrating a method for adjusting path delays as a function of phase relationship according to an embodiment of the present invention.

FIG. 22 is a flow chart illustrating a method for adjusting path delays as a function of phase relationship according to an embodiment of the present invention. At 2201 a phase relationship is identified between the arrival path and the required path.

At 2202, it is determined whether the phase relationship between the arrival path and required path is greater than 0. In response to determining that the phase relationship is greater than zero, control proceeds to 2203. In response to determining that the phase relationship is not greater than zero, control proceeds to 2206.

At 2203, it is determined whether the operating conditions are fast conditions ("fast corner"). In response to determining that the operating conditions are fast conditions, control proceeds to 2204. In response to determining that the operating conditions are not fast conditions, control proceeds to 2205.

At 2204, for hold time, the required path delay is increased if required path is more sensitive. The setup time is unlikely critical and some embodiments will avoid adding conservatism to its analysis.

At 2205, for setup time, the required path delay is decreased if required path is more sensitive. The hold time is unlikely critical and some embodiments will avoid adding conservatism to its analysis.

At 2206, it is determined whether the phase relationship is zero. In response to determining that the phase relationship is zero, control proceeds to 2207. In response to determining that the phase relationship is not zero, control proceeds to 2208.

At 2207, the impact of sensitivity differences should be a maximum at timing corners, so it is less important to add conservatism due to variation. However, the setup time arrival path delay may be optionally increased and the hold arrival path delay may be optionally decreased. Alternatively, the setup required path delay may optionally be decreased and the hold required path delay may be optionally increased.

At 2208, it is determined whether operating conditions are fast conditions ("fast corner"). In response to determining that the operating conditions are fast conditions, control proceeds to 2210. In response to determining that the operating conditions are not fast conditions, control proceeds to 2209.

At 2209, for hold time, arrival path delay is decreased if the arrival path is more sensitive.

At 2210, for setup time, arrival path delay is increased if the arrival path is more sensitive.

If the corresponding arrival and required path elements have similar sensitivities to voltage and temperature, and operating conditions change during the respective time interval, margins will be generally unaffected because both arrival and required times will change similarly.

The timing analysis techniques described above address how to model off chip changes and timing due to variation inside a device and to add conservatism to timing analysis within a device when rapid changes occur. These timing analysis techniques are based on the assumption that the analysis is performed within a single power supply domain. Thus, an assumption is made that changes in voltages are correlated and are affecting all of the different elements on a path at the same time. The following modeling technique models timing transfers involving path elements in different power supply domains. The miscorrelation between power supplies result in timing transfers that are subject to more relative delay uncertainty between arrival and required paths than typical timing transfers within a single power supply.

To model uncertainty, timing models may store a spread of minimum and maximum delays for each timing arc. For setup analysis, maximum arrival delays and minimum required delays may be used. For hold analysis, minimum arrival delays and maximum required delays may be used. The minimum and maximum delays may be computed to ensure multi-corner analysis are conservative. According to an embodiment of the present invention, timing analysis is performed at a number of timing corners to ensure conservatism across the space of parameters which affect timing. To make the analysis problem tractable, timing corners are selected so that parameter changes between those corners have a roughly linear effect on delays. Linear delay changes translate to worse case timing that are seen at timing corners. Corner selection may be a difficult problem, and the delay changes between selected corners may not be perfectly linear. Conservatism may be added to the corners to model random uncertainty at those corners, and non-linearity of delays between corners.

In the case of separate voltage supplies, the miscorrelation can be substantial. To model separate voltage supplies, additional delays are stored in each timing arc. In particular, for slow or low-voltage corners, additional minimum and maximum delay values may be stored per arc, which represent the delays at maximum voltage conditions. For fast or high voltage corners, additional minimum and maximum delay values may be stored per arc, which represent the delays at minimum voltage conditions. Each timing arc can also be tagged with the power supply that is relevant to it.

It is important to properly augment analysis to consider these additional timing arc delays. If analysis simply used the more conservative minimum and maximum range for both intra-supply timing transfers and inter supply transfers, the analysis would be overly pessimistic for the former.

Figure 23:
FIG. 23 is a flow chart illustrating a method for modeling variation according to a third embodiment of the present invention.

FIG. 23 is a flow chart illustrating a method for modeling jitter according to a third embodiment of the present invention. The method described performs timing analysis while accounting for multiple power supply domains. At 2301, timing graph traversal groups are generated. The timing graph traversal groups divide the timing analysis traversal problem into smaller sub-problems. The timing analysis traversal problem includes arrival and required path traversals that are often grouped together to reduce computational effort by merging common portions of paths. According to an embodiment of the present invention, the timing graph traversal groups may be determined from timing graph node groupings, based on clock-tree structure (common-clock pessimism groups). Each traversal group defines a set of paths to be traversed (arrival and required traversals) separately from other paths. Analysis of each set of paths may be treated differently than the analysis of other paths, for example, because of clock uncertainty.

Figure 24:
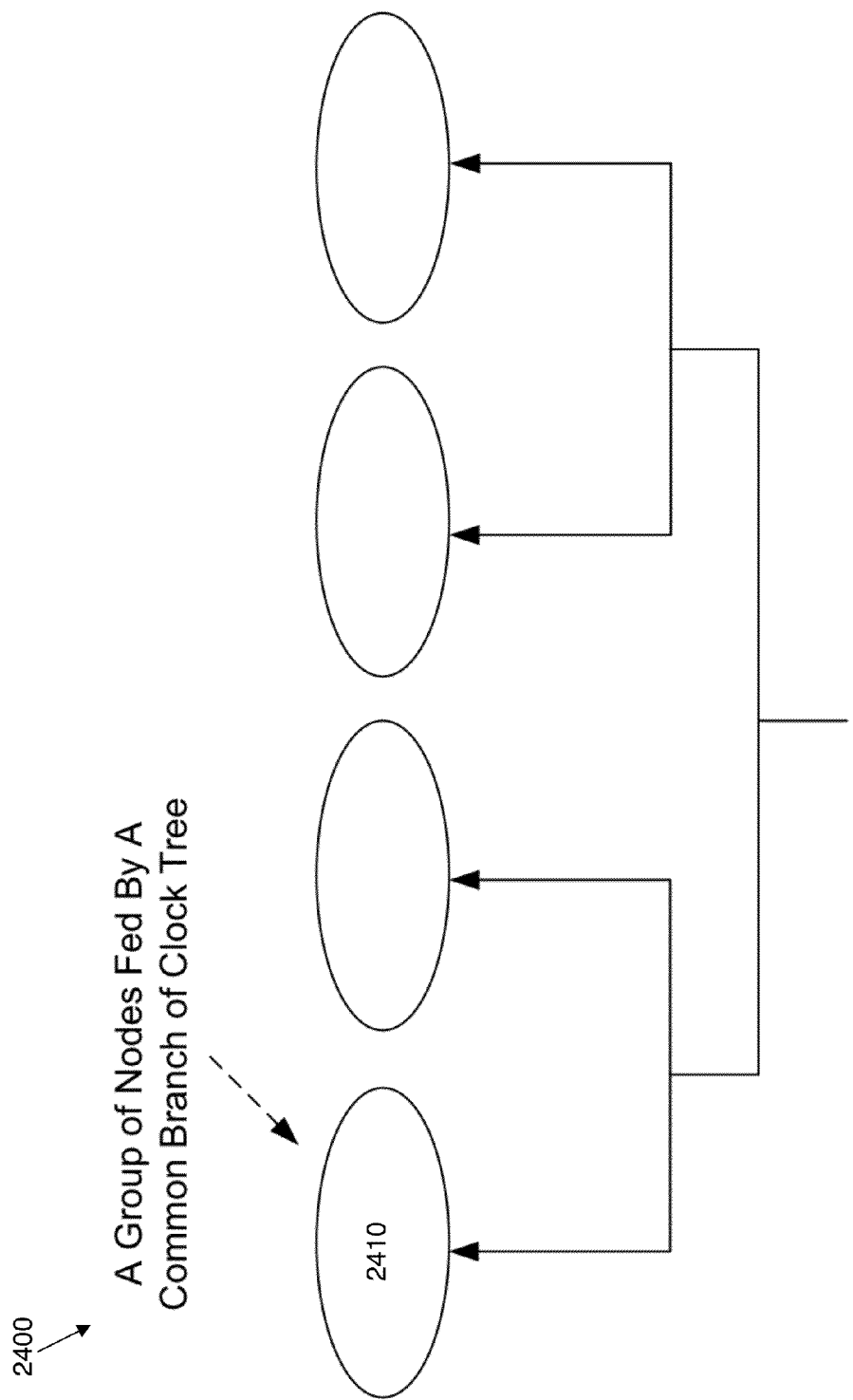
FIG. 24 illustrates a timing graph according to an embodiment of the present invention.

FIG. 24 illustrates a timing graph 2400 according to an embodiment of the present invention. Common-clock pessimism removal is a timing analysis technique used to model common path delay correlation. To facilitate common-clock pessimism removal, a timing graph such as the timing graph 2400 may be divided into groups of elements based on the branches of clock paths that feed them. When multiple common-clock pessimism groups have been identified for each source and destination clock, a list of source register common-clock pessimism groups may be identified. For each source register group, a list of destination register common-clock pessimism groups is identified. Then for each source and destination register group, arrival and required time traversals are performed that consider the common portions of the clock tree that apply to the source and destination groups being analyzed. The full minimum and maximum spread may still be conservatively used when processing the uncommon portions of the clock tree. FIG. 2400 illustrates a group of nodes 2410 fed by a common branch of a clock tree.

Figure 25:
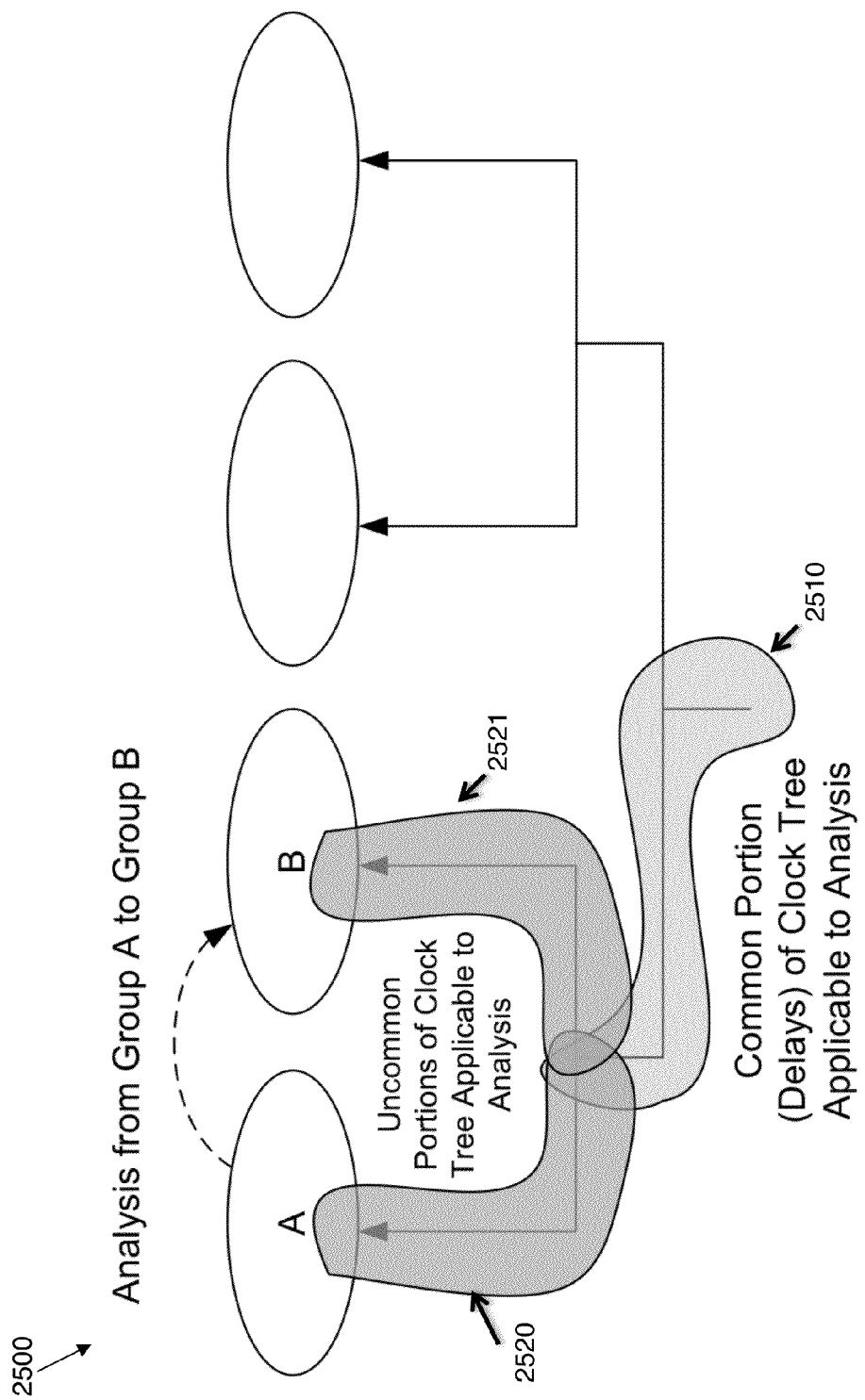
FIG. 25 illustrates timing graph groups generated according to an embodiment of the present invention.

FIG. 25 illustrates a timing graph 2500 with timing graph groups generated according to an embodiment of the present invention. A first group, group A, and a second group, group B, are identified. As illustrated, the timing graph 2500 includes a common portion 2510 of a clock tree associated with group A and group B that is applicable to analysis of both groups. The timing graph 2500 also includes an uncommon portions of the clock tree 2520 and 2521. Uncommon portion of the clock tree 2520 is applicable only to group A and uncommon portion of the clock tree 2521 is applicable only to group B for the purpose of analysis. A full minimum and maximum spread may be conservatively used when processing the uncommon portions of the clock tree, for analysis between node group A and node group B. This is a good time to clarify the nomenclature set out earlier. Node group A and node group B are examples of groupings of nodes used to define sets of traversals (transfers). Traversal or transfer groups may consist of traversals within node group A, within node group B, from group A to group B, and from group B to group A.

Referring back to FIG. 23, at 2302, power supplies relevant for a transfer group are identified. Each transfer has an associated arrival path and required path. The arrival path may include a source clock path and the data path. The required path may include the destination clock path. According to an embodiment of the present invention, power supplies relevant to the arrival path and required path are identified. A power supply may be relevant to an arrival path or required path if its state affects the delay along the path. For example, the power supply may be electrically connected to an element of the path to power or bias the element. The analysis to identify sets of power supplies may be performed while traversals are performed with default power supply assumptions.

At 2303, timing graph traversal groups generated at 2301 are sub-divided. For power supplies in a group that exist in both an arrival path and a required path, a supply (state) enumerating timing analysis is performed, as illustrated at 2305. According to an embodiment of the present invention, in order to reduce the runtime required for supply (state) enumerating timing analysis, the transfer groups identified at 2301 may be further sub-divided so that when enumerating combinations of power supply states for a given sub-group, only transfers that show meaningful different behavior for that combination of states are traversed. This would allow transfers that are unaffected by other power supply state assumptions to not be continually re-traversed, since they would yield identical results, or non-timing-limiting results, every time.

For example, in systems where clock networks are powered by different power supplies, it may be useful to ensure the nodes fed by those distinct networks are in separate groups so that traversals within a same power supply domain are done separately from traversals between the power supplies. This grouping of traversals will tend to be what algorithms supporting common-clock pessimism removal would create. However, not all embodiments may create them because the runtime cost would be prohibitive for the pessimism removed. Supply (state) enumeration would change the tradeoff significantly though, making the separation of these traversals more favorable. By further dividing the traversal groups based on power supply differences, traversal sub-groups for supply (state) enumeration can be identified. This will allow some paths to be traversed separately from other paths. Traversals within the same supply can use default power supply assumptions, as described at 2303 for a conservative analysis. Non-default assumptions may be performed using supply (state) enumerating analysis to ensure conservatism for traversals only between the clock branches powered by different supplies.

Figure 26:
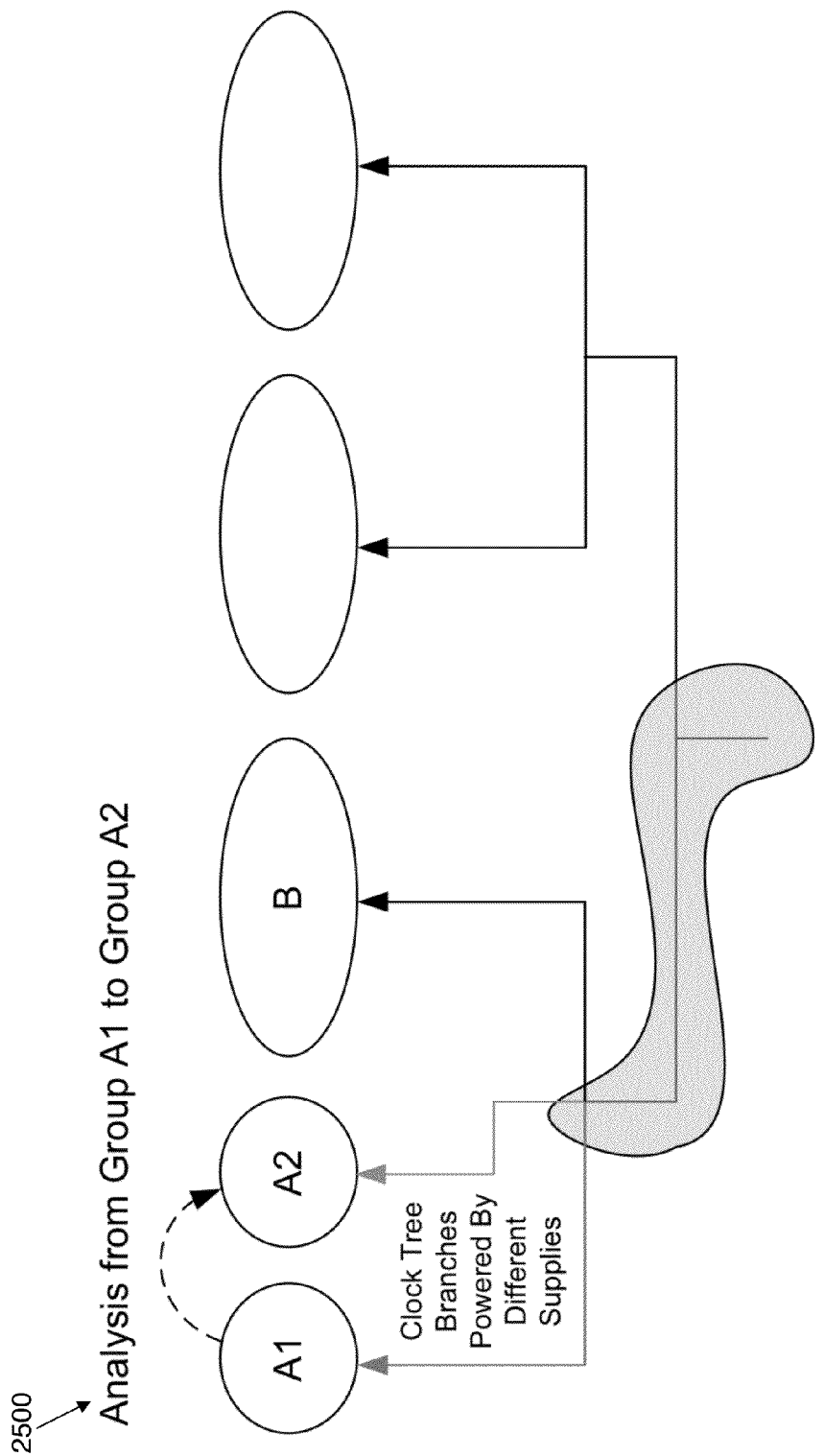
FIG. 26 illustrates sub-division of timing graph groups according to an embodiment of the present invention.

FIG. 26 illustrates sub-division of timing graph groups according to an embodiment of the present invention. As shown, FIG. 26 provides an example that illustrates the fragmentation of group A into groups A1 and A2 based on identifying power supplies feeding respective clock branches. The analysis (traversal group) from group A1 to group A2 will not only consider the minimum and maximum variation due to uncommon portions of the clock tree, as illustrated and discussed with reference to FIG. 25, it would also consider delay differences due to different non-default power supply assumptions. For a setup traversal, that would include high-voltage assumptions for the clock path feeding group A2.

Referring back to FIG. 23, at 2304, assumptions are applied to the power supplies. According to an embodiment of the present invention, subsequent arrival and required time traversals are applied where assumptions are made about the states of power supplies in each transfer group identified. In this embodiment, for each transfer group, all power supplies that are only associated with an arrival path in the group are assumed to be in a low voltage state for conservative setup analysis and in a high voltage state for conservative hold analysis. All power supplies that are only associated with a required path are assumed to be in a high voltage state for conservative setup analysis and a low state for conservative hold analysis.

At 2305, supply (state) enumerating analysis is performed. According to an embodiment of the present invention, for each sub-group generated at 2303, different combination of the states of the power supplies belonging in both an arrival path and a required path are enumerated to find a conservative critical path, making use of assumptions about states from 2304. The combination of states yielding the worst slack is identified and the worst slack value is used.

As described with reference to FIG. 23, traversal groups are generated at 2301 using common-clock pessimism groups and further sub-divided at 2304 based on power supplies. It should be appreciated that the traversal groups may be generated and sub-divided using other techniques or criteria and that the traversal groups may be formed and sub-divided using a single or different number of procedures.

It should also be appreciated that the techniques used with reference to FIGS. 23 through 26 may also be applied to performing timing analysis where conservatism is applied to correlated operating conditions other than power supplies. For example, embodiments of the present invention may be applied to model timing transfers involving path elements in different domains associated with a specific process of manufacturing, temperature, or age of components on the system. In these embodiments a method of performing timing analysis may involve identifying timing influences associated with path elements in arrival paths and required paths, and performing arrival time traversal and required time traversal for the arrival paths and required paths based on assumptions made for the timing influences associated with the path elements. The timing influences may include power supplies, processes used to manufacture the system, the age of components on the system, temperature, or other timing influences.

FIGS. 1, 12, 16, and 22-23 are flow charts that illustrate embodiments of the present invention. The procedures described in these figures may be performed by an EDA tool implemented by a computer system. Some of the techniques illustrated may be performed sequentially, in parallel or in an order other than that which is described, and that the procedures described may be repeated. It is appreciated that not all of the techniques described are required to be performed, that additional techniques may be added, and that some of the illustrated techniques may be substituted with other techniques.

Figure 27:
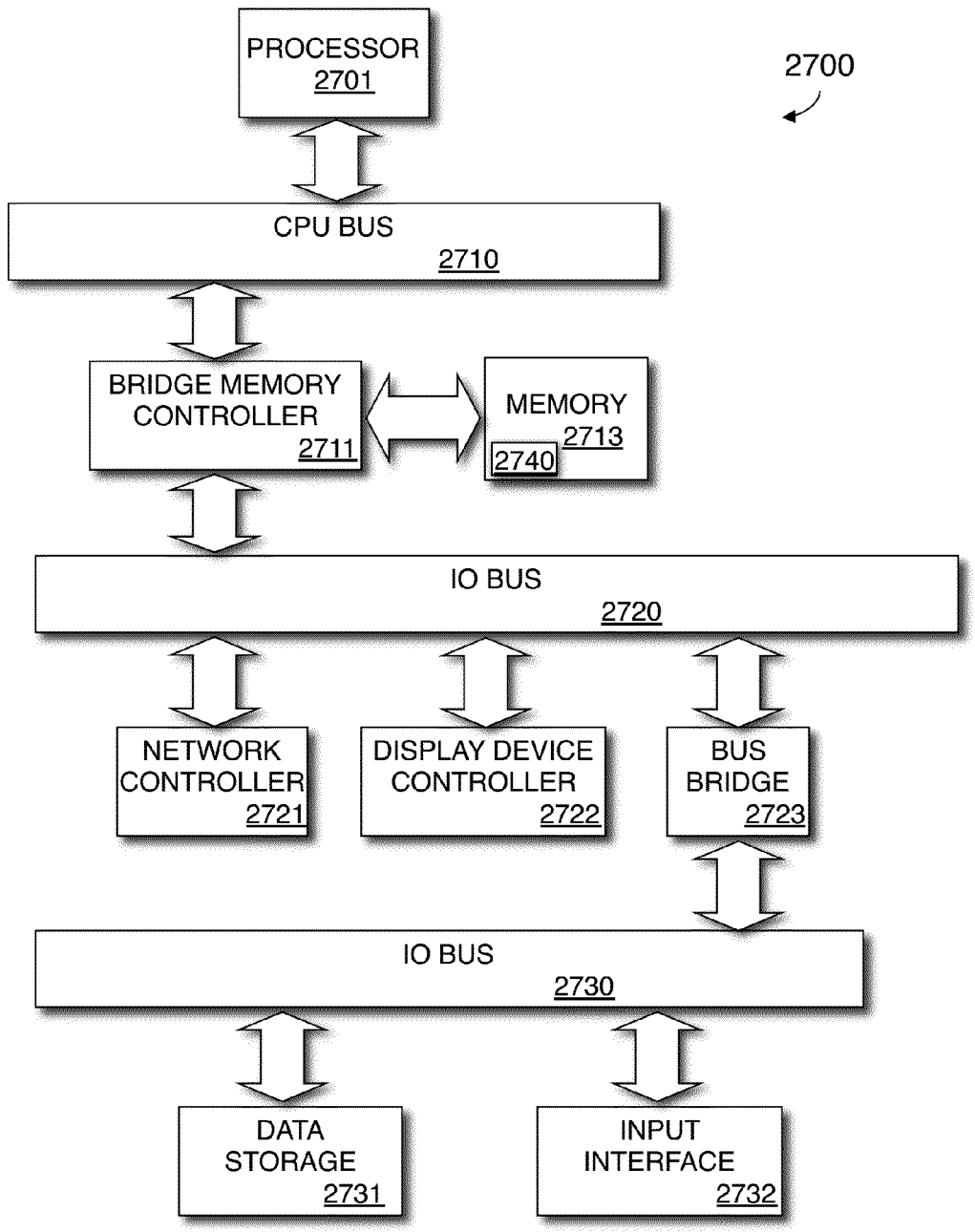
FIG. 27 illustrates a block diagram of a computer system implementing a system designer according to an embodiment of the present invention.

FIG. 27 is a block diagram of an exemplary computer system 2700 in which an example embodiment of the present invention resides. The computer system 2700 includes a processor 2701 that process data signals. The processor 2701 is coupled to a CPU bus 2710 or other switch fabric that transmits data signals between processor 2701 and other components in the computer system 2700.

The computer system 2700 includes a memory 2713. The memory 2713 may store instructions and code represented by data signals that may be executed by the processor 2701. A bridge memory controller 2711 is coupled to the CPU bus 2710 and the memory 2713. The bridge memory controller 2711 directs data signals between the processor 2701, the memory 2713, and other components in the computer system 2700 and bridges the data signals between the CPU bus 2710, the memory 2713, and a first IO bus 2720. According to an embodiment of the present invention, the processor 2701 may be directly coupled to the memory 2713 and communicates with the memory 2713 without a bridge memory controller 2711.

The first IO bus 2720 may be a single bus or a combination of multiple buses. The first IO bus 2720 provides communication links between components in the computer system 2700. A network controller 2721 is coupled to the first IO bus 2720. The network controller 2721 may link the computer system 2700 to a network of computers (not shown) and supports communication among the machines. A display device controller 2722 is coupled to the first IO bus 2720. The display device controller 2722 allows coupling of a display device (not shown) to the computer system 2700 and acts as an interface between the display device and the computer system 1200.

A second IO bus 2730 may be a single bus or a combination of multiple buses. The second IO bus 2730 provides communication links between components in the computer system 2700. A data storage device 2731 is coupled to the second IO bus 2730. An input interface 2732 is coupled to the second IO bus 2730. The input interface 2732 allows coupling of an input device to the computer system 2700 and transmits data signals from an input device to the computer system 2700. A bus bridge 2723 couples the first IO bus 2720 to the second IO bus 2730. The bus bridge 2723 operates to buffer and bridge data signals between the first IO bus 2720 and the second IO bus 2730. It should be appreciated that computer systems having a different architecture may also be used to implement the computer system 2700.

A system designer 2740 may reside in memory 2713 and be executed by the processor 2701. The system designer 2740 may operate to generate HDL, synthesize a system, place the system on a target device, route the system on the target device, perform timing analysis with jitter modeling, and assemble the system.

Figure 28:
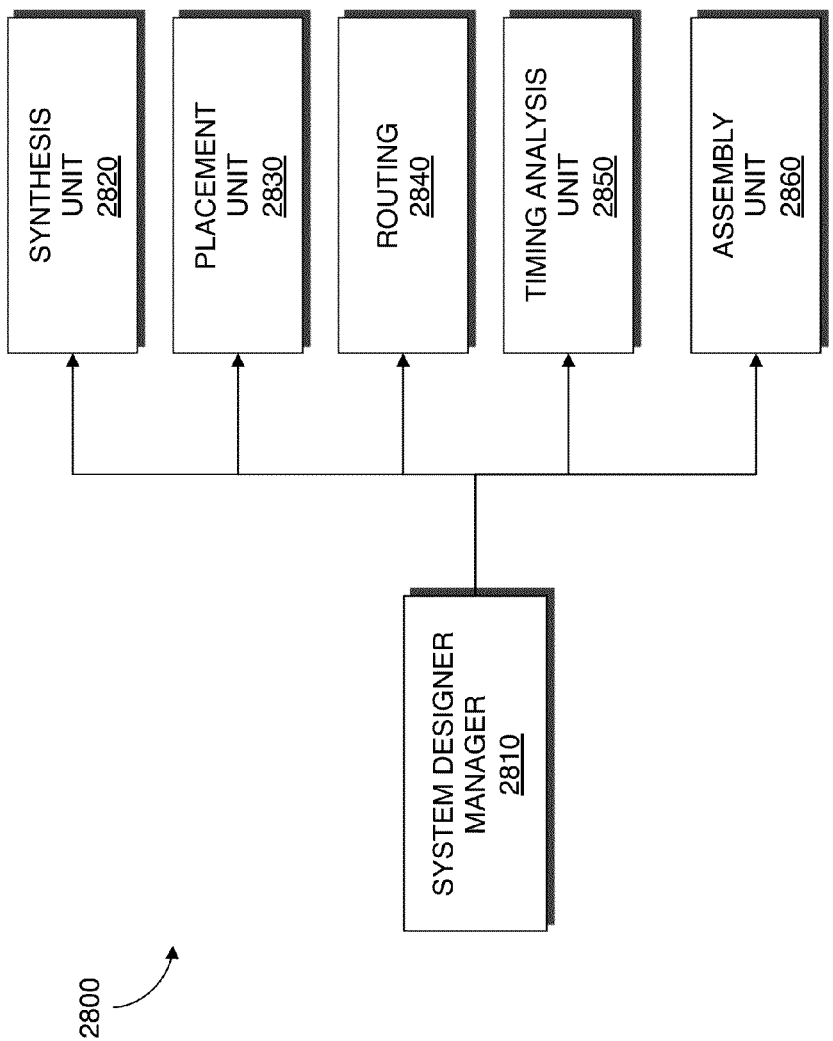
FIG. 28 is a block diagram of a system designer according to an embodiment of the present invention.

FIG. 28 illustrates a system designer 2800 according to an embodiment of the present invention. The system designer 2800 may be an EDA tool for designing a system on a target device such as an FPGA, structured application-specific integrated circuit (ASIC), ASIC, or other circuitry. FIG. 28 illustrates modules implementing an embodiment of the system designer 2800. According to one embodiment, the modules represent software modules and system design may be performed by a computer system such as the one illustrated in FIG. 23 executing sequences of instructions represented by the modules shown in FIG. 28. Execution of the sequences of instructions causes the computer system to support system design as will be described hereafter. In alternate embodiments, hard-wire circuitry may be used in place of or in combination with software instructions to implement embodiments of the present invention. Thus, embodiments of the present invention are not limited to any specific combination of hardware circuitry and software.

The system designer 2800 includes a designer manager 2810. The designer manager 2810 is connected to and transmits data between the components of the system designer 2800. The designer manager 2810 also generates a representation of the system from a description of the system input by a designer. According to an embodiment of the present invention, the representation of the system generated may be a register transfer language (RTL) representation in a hardware description languages such as Verilog, very-high-speed integrated circuit (VHSIC) hardware description language (VHDL), or other descriptive language.

The system designer 2800 includes a synthesis unit 2820 that performs synthesis. The synthesis unit 2820 generates a logic design of a system to be implemented on the target device. According to an embodiment of the system designer 2800, the synthesis unit 2820 takes a conceptual HDL design definition and generates an optimized logical representation of the system. The optimized logical representation of the system generated by the synthesis unit 2810 may include a representation that has a reduced number of functional blocks and registers, such as logic gates and logic elements, required for the system. Alternatively, the optimized logical representation of the system generated by the synthesis unit 2820 may include a representation that has a reduced depth of logic and that generates a lower signal propagation delay.

The synthesis unit 2820 also performs technology mapping. Technology mapping involves determining how to implement the functional blocks and registers in the optimized logic representation utilizing specific resources such as cells on a target device thus creating an optimized "technology-mapped" netlist. The technology-mapped netlist illustrates how the resources (cells) on the target device are utilized to implement the system. In an embodiment where the target device is an FPGA, the technology-mapped netlist may include cells such as logic array blocks (LABs), registers, memory blocks, digital signal processing (DSP) blocks, input output (JO) elements or other components.

The system designer 2800 includes a placement unit 2830 that processes the optimized technology-mapped netlist to produce a placement for each of the functional blocks. The placement identifies which components or areas on the target device are to be used for specific functional blocks and registers.

The system designer 2800 includes a routing unit 2840 that performs routing. The routing unit 2840 determines the routing resources on the target device to use to provide interconnection between the components implementing functional blocks and registers of the logic design.

The system designer 2800 includes a timing analysis unit 2850 that performs timing analysis to determine whether timing constraints of the system are satisfied. In addition, the timing analysis may also perform jitter modeling and analysis. According to an embodiment of the present invention, the timing analysis unit 2850 may operate to perform the procedures described with reference to FIGS. 12, 16, and 22-23.

The system designer 2800 includes an assembly unit 2860 that performs an assembly procedure that creates a data file that includes the design of the system generated by the system designer 2800. The data file may be a bit stream that may be used to program the target device. The assembly unit 2860 may output the data file so that the data file may be stored or alternatively transmitted to a separate machine used to program the target device. It should be appreciated that the assembly unit 2860 may also output the design of the system in other forms such as on a display device or other medium.

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 29:
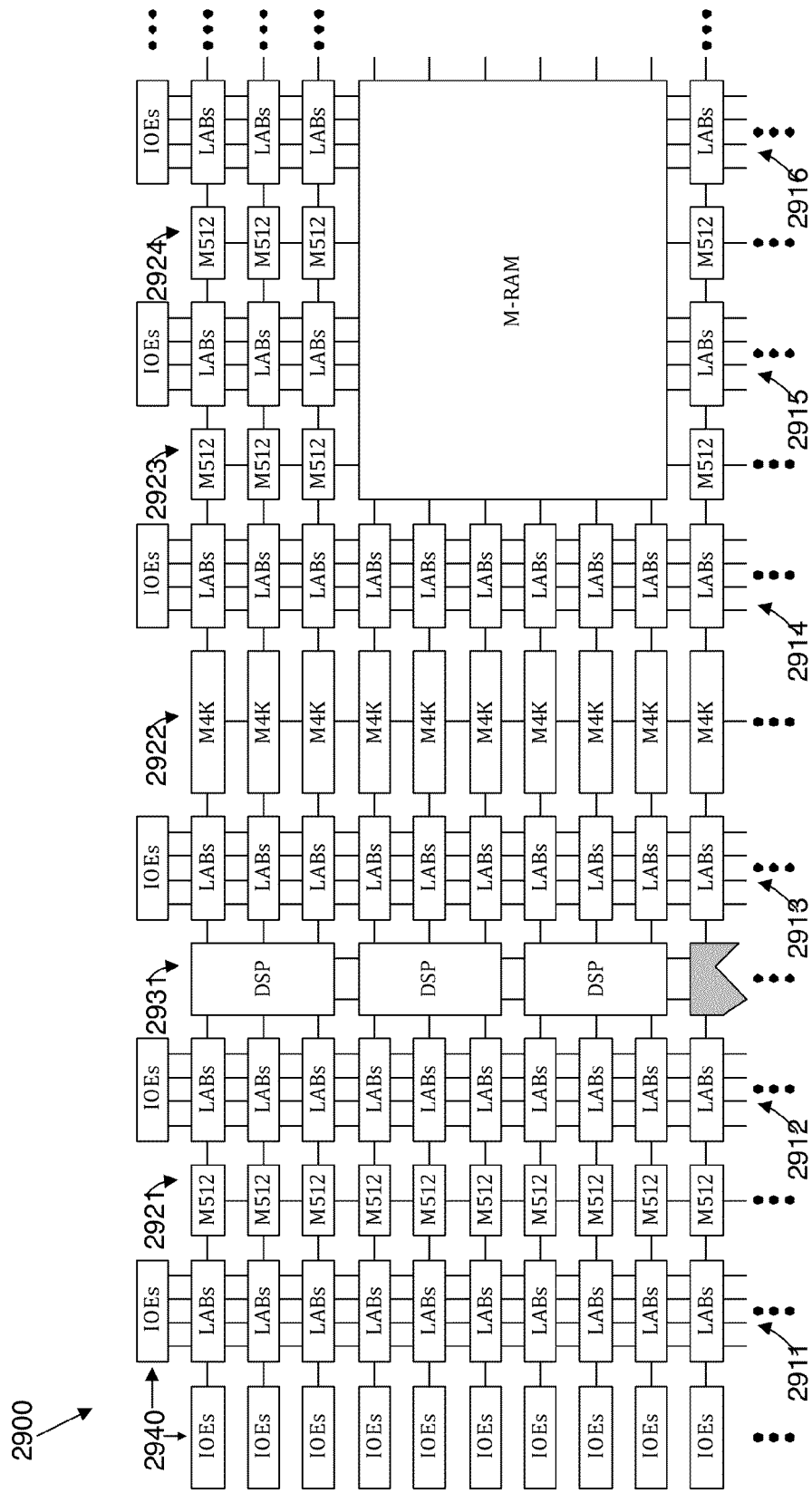
FIG. 29 illustrates an exemplary target device according to an embodiment of the present invention.

FIG. 29 illustrates a device 2900 that may be used to implement a target device according to an embodiment of the present invention. The device 2900 is a field programmable gate array (FPGA) that includes a plurality of logic-array blocks (LABs). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present invention, the logic block may operate similarly to an adaptive logic module (ALM), such as those found in Stratix devices manufactured by Altera Corporation. LABs are grouped into rows and columns across the device 2900. Columns of LABs are shown as 2911-2916. It should be appreciated that the logic block may include additional or alternate components.

The device 2900 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 2900. Columns of memory blocks are shown as 2921-2924.

The device 2900 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 2900 and are shown as 2931.

The device 2900 includes a plurality of input/output elements (IOEs) 2940. Each IOE feeds an 10 pin (not shown) on the device 2900. The IOEs 2940 are located at the end of LAB rows and columns around the periphery of the device 2900. Each IOE may include a bidirectional IO buffer and a plurality of registers for registering input, output, and output-enable signals.

The device 2900 may include routing resources such as LAB local interconnect lines, row interconnect lines ("H-type wires"), and column interconnect lines ("V-type wires") (not shown) to route signals between components on the target device.

In the foregoing specification, embodiments of the invention have been described with reference to specific exemplary embodiments thereof. It will, however, be evident that various modifications and changes may be made thereto without departing from the broader spirit and scope of the embodiments of the invention. For example, path delays were described as being identified from delay per element functions generated from voltage functions of signals. It should be appreciated that other delay-impacting parameter functions may be used in place of or in addition to voltage functions. Other delay-impacting parameters may include temperature, and other parameters. The specification and drawings are, accordingly, to be regarded in an illustrative rather than restrictive sense.

What is claimed is:

1. A method for modeling variation in a system, comprising:
generating timing graph traversal groups which divide a timing analysis problem into smaller sub-problems, wherein each timing graph traversal group has an associated set of arrival paths and required paths;
identifying delay-impacting parameters associated with path elements in the arrival paths, that include a source clock path and a data path, and the required paths, that include a destination clock path;
performing a first arrival time traversals for a first subset of the arrival paths and a first required time traversal for a first subset of the required paths based on a first set of assumptions of values for a first subset of the delay-impacting parameters associated with the path elements;
performing a second arrival time traversal for a second subset of the arrival paths and a second required time traversal for a second subset of the required paths based on a second set of assumptions of values for a second subset of the delay-impacting parameters, wherein assumptions for delay impacting parameters for a first timing graph traversal group are different from assumptions for delay-impacting parameters for a second timing graph traversal group.

2. The method of claim 1, wherein identifying the delay-impacting parameters is performed during traversals with default delay-impacting parameter assumptions.

3. The method of claim 1, wherein for each timing graph traversal group, delay-impacting parameters associated with only an arrival path are assumed to be in a high-delay state for conservative setup analysis and in a low-delay state for conservative hold analysis.

4. The method of claim 1, wherein for each timing graph traversal group, delay-impacting parameters associated with only a required path are assumed to be in a low-delay state for conservative setup analysis and in a high-delay state for conservative hold analysis.

5. The method of claim 1, wherein for each timing graph traversal group, delay-impacting parameters associated with both an arrival path and a required path are analyzed using an enumeration of delay-impacting parameter states.

6. The method of claim 5, wherein the enumeration of delay-impacting parameter states comprises:
assigning a combination of states to the delay-impacting parameters associated with both the arrival path and the required path;
performing arrival time traversal and required time traversal for the combination of states; and
selecting the worst slack across various combinations of states.

7. The method of claim 1, further comprising:
for each timing graph traversal group, determining whether each of the delay-impacting parameters in the timing graph traversal group is associated with only an arrival path or only a required path; and
providing an assumption to each of the delay-impacting parameters, in response to such an association.

8. The method of claim 1, wherein the delay-impacting parameters include power supply voltage.

9. The method of claim 1, wherein the delay-impacting parameters include a process variable.

10. A non-transitory computer readable medium including sequence of instructions stored thereon for causing a computer to execute a method, comprising:
generating timing graph traversal groups which divide a timing analysis problem into smaller sub-problems, wherein each timing graph traversal group has an associated set of arrival paths and required paths;
identifying power supplies associated with path elements in arrival paths, that include a source clock path and a data path, and required paths, that include a destination clock path;
performing a first arrival time traversal for a first subset of the arrival paths and a first required time traversal for a first subset of the required paths based on a first set of assumptions of values for a first subset of the power supplies associated with the path elements; and
performing a second arrival time traversal for a second subset of the arrival paths and a second required time traversal for a second subset of the required paths based on a second set of assumptions of values for a second the subset of the power supplies, wherein assumptions for values of the power supplies for a first timing graph traversal group are different from assumptions for values of power supplies for a second timing graph traversal group.

11. The non-transitory computer readable medium of claim 10, wherein identifying the power supplies is performed during traversals with default power supply assumptions.

12. The non-transitory computer readable medium of claim 10, wherein for each timing graph traversal group, the power supplies associated with only an arrival path are assumed to be in a low voltage state for conservative setup analysis and in a high voltage state for conservative hold analysis.

13. The non-transitory computer readable medium of claim 10, wherein for each timing graph traversal group, the power supplies associated with only a required path are assumed to be in a high voltage state for conservative setup analysis and in a low voltage state for conservative hold analysis.

14. The non-transitory computer readable medium of claim 10, wherein for each timing graph traversal group, the power supplies associated with both an arrival path and a required path are analyzed using an enumeration of power supply states.

15. The non-transitory computer readable medium of claim 14, wherein the enumeration of power supply states comprises:
assigning a combination of states to the power supplies associated with both the arrival path and the required path;
performing arrival time traversal and required time traversal for the combination of states; and
selecting the worst slack across various combinations of states.

16. The non-transitory computer readable medium of claim 10, further comprising:
for each timing graph traversal group, determining whether each of the power supplies in the timing graph traversal group is associated with only an arrival path or only a required path; and
providing an assumption to each of the power supplies, in response to such an association.

17. A system designer unit comprising:
a grouping unit that generates timing graph traversal groups which divide a timing analysis problem into smaller sub-problems, wherein each timing graph traversal group has an associated set of arrival paths and required paths;
a power supply identification unit that identifies power supplies associated with path elements in arrival paths, that include a source clock path and a data path, and required paths, that include a destination clock path;
a traversal unit that performs arrival time traversals for a subset of the arrival paths and required time traversals for a subset of the required paths based on assumptions of values made for a subset of power supplies associated with the path elements, wherein assumptions for values of power supplies for a first timing graph traversal group are different from assumptions for values of power supplies for a second timing graph traversal group.

18. The system designer unit of claim 17, wherein for each timing graph traversal group, the power supplies associated with both an arrival path and a required path are analyzed using an enumeration of power supply states.

19. The system designer unit of claim 18, wherein the enumeration of power supply states comprises:
assigning a combination of states to the power supplies associated with both the arrival path and the required path;
performing arrival time traversal and required time traversal for the combination of states; and
selecting the worst slack across various combinations of states.

20. The system designer of claim 17, wherein the grouping unit provides an assumption to each of the power supplies in response to determining each of the power supplies is associated with only an arrival path or only a required path.

21. The system designer of claim 17, wherein for each timing graph traversal group, the power supplies associated with only an arrival path are assumed to be in a low voltage state for conservative setup analysis and in a high voltage state for conservative hold analysis.

22. The system designer of claim 17, wherein for each timing graph traversal group, the power supplies associated with only a required path are assumed to be in a high voltage state for conservative setup analysis and in a low voltage state for conservative hold analysis.

23. A system designer unit comprising:
a grouping unit that generates timing graph traversal groups which divide a timing analysis problem into smaller sub-problems, wherein each timing graph traversal group has an associated set of arrival paths and required paths;
delay-impacting parameters identification unit that identifies delay-impacting parameters associated with path elements in arrival paths, that include a source clock path and a data path, and required paths, that include a destination clock path; and
a traversal unit that performs arrival time traversals for a subset of the arrival paths and required time traversals for a subset of the required paths based on assumptions of values for a subset of the delay-impacting parameters associated with the path elements, wherein assumptions of values for delay-impacting parameters for a first timing graph traversal group are different from assumptions of values for delay-impacting parameters for a second timing graph traversal group.

24. The system designer of claim 23, wherein the grouping unit provides an assumption to each of the delay-impacting parameters in response to determining each of the delay-impacting parameters is associated with only an arrival path or only a required path.

25. The system designer of claim 23, wherein for each timing graph traversal group, the power supplies associated with only an arrival path are assumed to be in a low voltage state for conservative setup analysis and in a high voltage state for conservative hold analysis.

26. The system designer of claim 23, wherein for each timing graph traversal group, the power supplies associated with only a required path are assumed to be in a high voltage state for conservative setup analysis and in a low voltage state for conservative hold analysis.

* * * * *